(12) United States Patent
Kim et al.

(10) Patent No.: US 9,586,682 B2
(45) Date of Patent: Mar. 7, 2017

(54) UNMANNED AERIAL VEHICLE CONTROL APPARATUS AND METHOD

(71) Applicant: LG ELECTRONICS INC., Seoul (KR)

(72) Inventors: Jihwan Kim, Seoul (KR); Kihyung Kim, Seoul (KR); Kichu Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/316,367

(22) Filed: Jun. 26, 2014

(65) Prior Publication Data

US 2015/0316927 A1    Nov. 5, 2015

(30) Foreign Application Priority Data

Apr. 30, 2014    (KR) ........................ 10-2014-0052081

(51) Int. Cl.
*G06F 7/00* (2006.01)
*B64C 39/02* (2006.01)
(Continued)

(52) U.S. Cl.
CPC ............ *B64C 39/024* (2013.01); *B64D 47/08* (2013.01); *G01C 21/00* (2013.01); *G01S 19/00* (2013.01);
(Continued)

(58) Field of Classification Search
CPC .. G05D 1/0011; G05D 1/0016; G05D 1/0038; G05D 1/0022; G05D 1/0044; G05D 1/02; G05D 1/0202; G05D 1/10; G05D 1/101; G05D 1/102; G05D 27/00; G05D 27/02; G05D 2201/0207; G05D 2201/0214; G05D 1/012; H04M 2250/02; H04M 2250/04; H04M 2250/06; H04M 2250/10; H04M 2250/22; G06F 3/0416;
(Continued)

(56) References Cited

U.S. PATENT DOCUMENTS 7,054,715 B2 *    5/2006    Takano .......................... 700/245
7,734,254 B2 *    6/2010    Frost ...................... A63H 30/04
                                                              244/189

(Continued)

*Primary Examiner* — Muhammad Shafi
(74) *Attorney, Agent, or Firm* — Birch, Stewart, Kolasch & Birch, LLP

(57) ABSTRACT

Disclosed is a digital device controlling an unmanned aerial vehicle to provide a flight trajectory feedback based on at least one of an application and a task of the application. The digital device includes a communication unit configured to communicate with an unmanned aerial vehicle, a display unit, and a processor configured to control the communication unit and the display unit. The processor is further configured to transmit application data including information of at least one of an application executed by the digital device and/or a task of the application to the unmanned aerial vehicle through the communication unit. The application data causes the unmanned aerial vehicle to provide a flight trajectory feedback determined based on the application data. The flight trajectory feedback is one of plural predetermined flight trajectory feedbacks and displays at least one of the application and the task pairing with the unmanned aerial vehicle.

18 Claims, 22 Drawing Sheets

(51) Int. Cl.
*G05D 1/00* (2006.01)
*G01C 21/00* (2006.01)
*B64D 47/08* (2006.01)
*G01S 19/00* (2010.01)
*G01S 19/48* (2010.01)
*G03B 15/00* (2006.01)
*G01C 21/20* (2006.01)

(52) U.S. Cl.
CPC ............ *G01S 19/48* (2013.01); *G03B 15/006* (2013.01); *G05D 1/0016* (2013.01); *G05D 1/0038* (2013.01); *G05D 1/0094* (2013.01); *B64C 2201/027* (2013.01); *B64C 2201/146* (2013.01); *G01C 21/20* (2013.01)

(58) Field of Classification Search
CPC . B64C 39/024; B64C 39/028; B64C 2201/00; B64C 2201/127; B64C 2201/146; B64C 2203/00; B64C 2700/6269; A63H 27/00; A63H 27/06; A63H 27/12; A63H 30/00; A63H 30/02; A63H 30/04; G05B 2219/23077
USPC .......................................................... 701/2
See application file for complete search history.

(56) References Cited

U.S. PATENT DOCUMENTS

| | | |
|---|---|---|
| 2003/0052823 A1 | 3/2003 | Carroll |
| 2003/0195658 A1* | 10/2003 | Takano ........................ 700/245 |
| 2004/0081110 A1* | 4/2004 | Koskimies .................... 370/315 |
| 2008/0108385 A1* | 5/2008 | Frost ..................... A63H 30/04 455/556.1 |
| 2010/0004798 A1 | 1/2010 | Bodin et al. |
| 2011/0221692 A1 | 9/2011 | Seydoux et al. |
| 2011/0288696 A1 | 11/2011 | Lefebure |
| 2013/0126679 A1 | 5/2013 | Estkowski et al. |
| 2013/0173088 A1 | 7/2013 | Callou et al. |
| 2013/0176423 A1 | 7/2013 | Rischmuller et al. |

\* cited by examiner

UNMANNED AERIAL VEHICLE CONTROL APPARATUS AND METHOD

This application claims the benefit of Korean Patent Application No. 10-2014-0052081, filed on Apr. 30, 2014, which is hereby incorporated by reference as if fully set forth herein.

BACKGROUND OF THE INVENTION

Field of the Invention

Embodiments relate to an unmanned aerial vehicle (UAV) control apparatus and method.

Discussion of the Related Art

Unmanned aerial vehicles (UAV) having various purposes have been developed. According to development of unmanned aerial vehicles, unmanned aerial vehicles, which are inexpensive and easily controllable, have been placed on the market. An experimental delivery service using a quadcopter widely known as a drone has been carried out. Therefore, application of unmanned aerial vehicles has increased.

According to spread of unmanned aerial vehicles, various control methods thereof have been proposed. For example, an unmanned aerial vehicle may be controlled by a portable device rather than an exclusive controller. Therefore, a user may control an unmanned aerial vehicle by simply installing software for controlling unmanned aerial vehicles on his/her portable device (for example, mobile phone).

Therefore, the unmanned aerial vehicle may relate to various software or applications of the controller. However, since the unmanned aerial vehicle is generally operated at a position distant from the controller, it is difficult to determine by which software or application the unmanned aerial vehicle is controlled. Further, research on unmanned aerial vehicles is focused on physical control and artificial intelligence of unmanned aerial vehicles and research on various programs of user portable devices and interworking between unmanned aerial vehicles and programs of user portable devices is insufficient now.

SUMMARY OF THE INVENTION

Accordingly, embodiments are directed to an unmanned aerial vehicle (UAV) control apparatus and method that substantially obviate one or more problems due to limitations and disadvantages of the related art.

Additional advantages, objects, and features of the embodiments will be set forth in part in the description which follows and in part will become apparent to those having ordinary skill in the art upon examination of the following or may be learned from practice of the embodiments. The objectives and other advantages of the embodiments may be realized and attained by the structure particularly pointed out in the written description and claims hereof as well as the appended drawings.

In one embodiment, a digital device includes a communication unit configured to communicate with an unmanned aerial vehicle, a display unit, and a processor configured to control the communication unit and the display unit, wherein the processor is further configured to transmit application data including information of at least one of an application executed by the digital device and a task of the application to the unmanned aerial vehicle through the communication unit, the application data causes the unmanned aerial vehicle to provide a flight trajectory feedback determined based on the application data, the flight trajectory feedback is one of a plurality of predetermined flight trajectory feedbacks and indicates at least one of the application and the task of the digital device pairing with the unmanned aerial vehicle, and each of the plurality of flight trajectory feedbacks corresponds to different applications or tasks, respectively.

The processor may be further configured to transmit the application data, if the digital device executes at least one of the application and the task.

The processor may be further configured to transmit the application data, if a predetermined time interval has passed from transmission time of the previous application data transmission time or if the processor receives an application data transmission request.

The application data may comprise flight coordinates corresponding to the flight trajectory feedback.

The unmanned aerial vehicle may be configured to select one flight trajectory feedback from the plurality of predetermined flight trajectory feedbacks based on the application data.

Each of the plurality of predetermined flight trajectory feedbacks may comprise at least one of an upward and a downward movement, a leftward and a rightward movement, a spiral movement, a circular movement, and a rotating movement, and may have different flight trajectories from a start point to an end point to each other.

Each of the plurality of predetermined flight trajectory feedbacks may be formed in the shape of at least one of a character, a number, a figure, and a mark.

The unmanned aerial vehicle may be configured to determine at least one of a size, a height, and a position of the selected flight trajectory feedback, based on at least one of the size of a space in which the unmanned aerial vehicle is flyable obstacles within a flight trajectory, a fly height, and a distance between the digital device and the unmanned aerial vehicle.

The processor may be further configured to display at least one of a flying height of the unmanned aerial vehicle, a flyable time of the unmanned aerial vehicle, a distance between the digital device and the unmanned aerial vehicle, a direction of the unmanned aerial vehicle, an application with which the unmanned aerial vehicle pairs, and a task with which the unmanned aerial vehicle pairs on the display unit.

The processor may be further configured to display an application list including first images expressing a plurality of applications of the digital device and a second image expressing the unmanned aerial vehicle on the display unit.

The processor may be further configured to detect a first image located nearest the second image by dragging the second image, to execute an application corresponding to the detected first image in the digital device, and to pair the executed application with the unmanned aerial vehicle by transmitting application data of the executed application to the unmanned aerial vehicle.

The processor may be further configured to detect a first image located nearest the second image by scrolling the application list, to execute an application corresponding to the detected first image in the digital device, and to pair the executed application with the unmanned aerial vehicle by transmitting application data of the executed application to the unmanned aerial vehicle.

The processor may be further configured to display icons of the first images and the second image as icons on the display unit, to detect a first image overlapping the second image by drag and drop operation, to execute an application corresponding to the detected first image in the digital device, and to pair the executed application with the unmanned aerial vehicle by transmitting application data of the executed application to the unmanned aerial vehicle.

The digital device may further include a first satellite positioning unit, and the processor may be further configured to acquire position information of the digital device from the first satellite positioning unit, to display a geographic map on the display unit based on at least one of an application executed by the digital device and a task of the application, and to display a position corresponding to the position information of the digital device acquired from the first positioning unit on the geographic map.

The processor may be further configured to acquire position information of the unmanned aerial vehicle from a second satellite positioning unit of the unmanned aerial vehicle and to display a position corresponding to the position of the unmanned aerial device acquired from the second satellite positioning unit on the geographic map.

The digital device may further include a first camera unit, the unmanned aerial vehicle may comprise a second camera unit, and the processor may be further configured to display an image acquired from the second camera unit on at least a part of the display unit.

If an image recording application including a zoom factor is executed by the digital device, the processor may be further configured to receive adjustment of the zoom factor, to acquire an image from the first camera unit, if the adjusted zoom factor is a predetermined zoom level or less, and to transmit application data including the adjusted zoom factor to the unmanned aerial vehicle and to acquire an image from the second camera unit by dispatching the unmanned aerial vehicle to a position corresponding to a viewing angle of the adjusted zoom factor, if the adjusted zoom factor exceeds the predetermined zoom level.

The digital device may further include a first satellite positioning unit, the unmanned aerial vehicle may further comprise a second satellite positioning unit, and the processor may be configured to acquire position information from the first positioning unit, if the adjusted zoom factor is the predetermined zoom level or less, and to acquire position information from the second positioning unit, if the adjusted zoom factor exceeds the predetermined zoom level.

The digital device may further include a first satellite positioning unit and a first camera unit, the unmanned aerial vehicle may comprise a second satellite positioning unit and a second camera unit, at least one of the application and the task may include image recording, and the processor may be further configured to select at least one of an image from the first camera unit and an image from the second camera unit and to select at least one position information from the first satellite positioning unit and position information from the second satellite positioning unit, based on at least one of a distance between the digital device and the unmanned aerial vehicle, a predetermined mode of the image recording, and an angle between the direction of the first camera unit and the direction of the second camera unit.

In another embodiment, an unmanned aerial vehicle control method includes executing at least one of an application and a task of the application in a digital device and transmitting application data comprising information of the at least one of the application and the task to an unmanned aerial vehicle, wherein the application data causes the unmanned aerial vehicle to provide a flight trajectory feedback determined based on the application data, the flight trajectory feedback is one of a plurality of predetermined flight trajectory feedbacks and indicates the at least one of the application and the task of the digital device pairing with the unmanned aerial vehicle, and the plurality of flight trajectory feedbacks corresponds to different applications or tasks, respectively.

It is to be understood that both the foregoing general description and the following detailed description of the embodiments are exemplary and explanatory and are intended to provide further explanation of the embodiments as claimed.

BRIEF DESCRIPTION OF THE DRAWINGS

Arrangements and embodiments may be described in detail with reference to the following drawings in which like reference numerals refer to like elements and wherein.

DETAILED DESCRIPTION OF THE INVENTION

Figure 1:
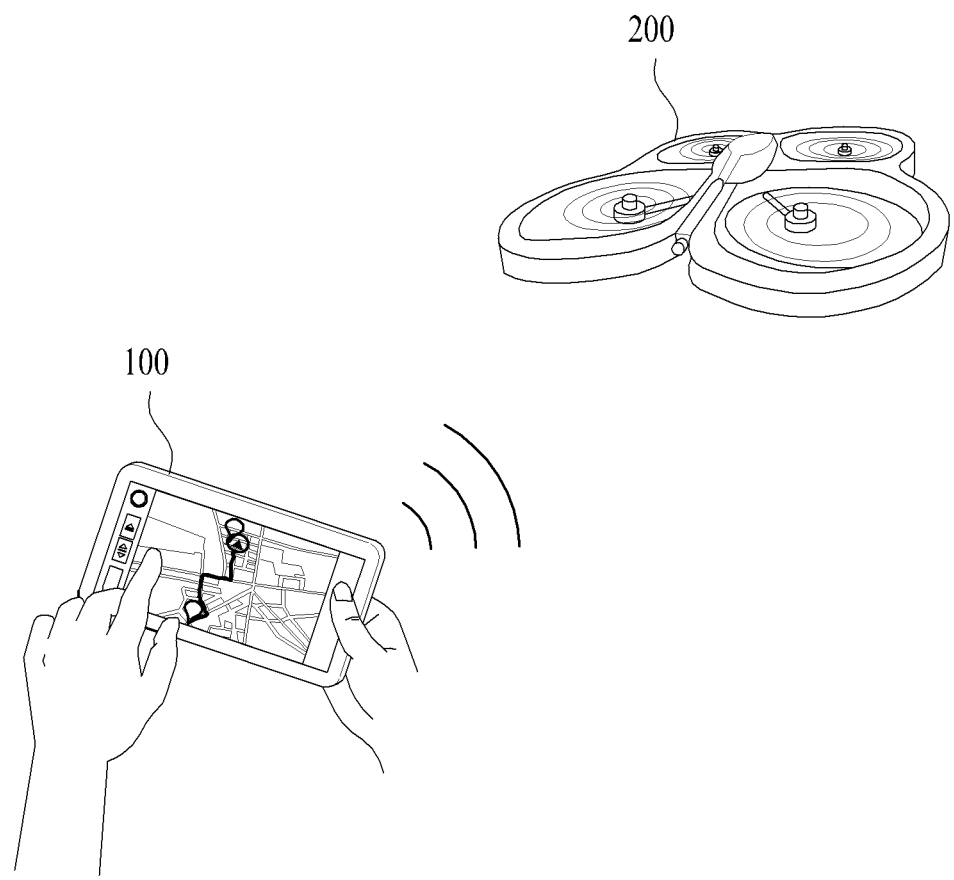
FIG. 1 is a view illustrating a control environment of an unmanned aerial vehicle using a digital device.

Hereinafter, embodiments will be described with reference to the annexed drawings. The configuration and functions disclosed in the specification, shown in the drawings and described thereby, are described as at least one embodiment, but the technical sprit, configuration, and functions disclosed in the specification are not limited thereby.

Terms used in the specification are terms which are defined in consideration of the functions obtained in accordance with the embodiments, and the definitions of these terms may be changed according to the intention of those skilled in the art or a usual practice or advent of new technologies. Further, in some cases, a term may be defined by the applicant. In this case, the definition of the term should be stated in the corresponding description section of the specification. Therefore, the terms used in the specification should be interpreted based on the substantial meanings of the terms and the whole content of the specification.

Further, specific structural and functional descriptions in the embodiments in accordance with the concept of the specification disclosed in the specification have been made only for a better understanding of the embodiments in accordance with the concept of the specification. It is intended that that the embodiments in accordance with the concept of the specification are not limited and various modifications and variations can be made in the embodiments in accordance with the concept of the specification.

While the embodiments in accordance with the concept of the specification are susceptible to various modifications and alternative forms, specific embodiments thereof are shown by way of example in the drawings and will herein be described in detail. It should be understood, however, that there is no intent to limit the embodiments in accordance with the concept of the specification to the particular forms disclosed, but on the contrary, the embodiments in accordance with the concept of the specification are to cover all modifications, equivalents, and alternatives falling within the spirit and scope of the specification on as defined by the claims.

It will be understood that, although the terms first, second, etc. may be used in the specification to describe various elements, components, regions, layers and/or sections, these elements, components, regions, layers and/or sections should not be limited by these terms. These terms should be used to discriminate one element from other elements. For example, a first element may be called a second element and the second element may be called the first element, without departing from the scope and spirit in accordance with the concept of the specification.

Further, It will be understood that throughout the specification, when a unit "includes" an element, it means that the unit does not exclude other elements but may further include other elements unless there is special opposite statement. Further, the terms " . . . unit" and " . . . part" stated in the specification mean units of processing at least one function or operation and may be implemented by combination of hardware and/or software.

FIG. 1 is a view illustrating a control environment of an unmanned aerial vehicle using a digital device.

With reference to FIG. 1, an unmanned aerial vehicle 200 is controlled by a digital device 100. Although FIG. 1 illustrates a quadcopter as the unmanned aerial vehicle 200, an arbitrary unmanned aerial vehicle including one or more engines and/or one or more propellers may be employed. Further, the digital device 100 may employ a mobile phone, a tablet computer, a computer, a personal digital assistant (PDA), or an arbitrary computing device.

Figure 2:
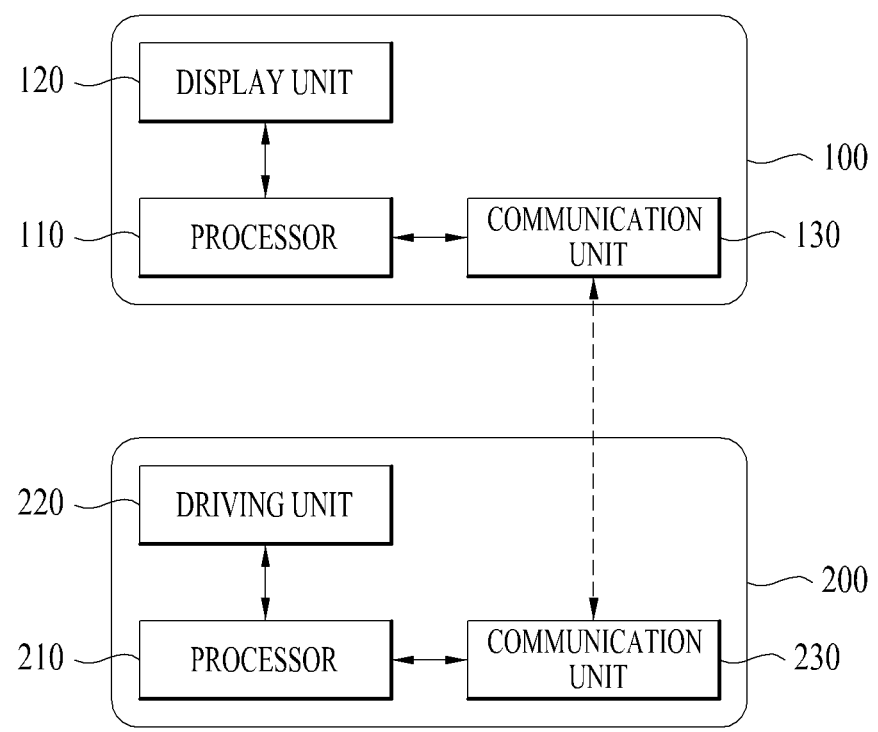
FIG. 2 is a block diagram illustrating configurations of a digital device and an unmanned aerial vehicle in accordance with one embodiment.

FIG. 2 is a block diagram illustrating configurations of a digital device and an unmanned aerial vehicle in accordance with one embodiment.

The digital device 100 may include a display unit 120, a communication unit 130, and a processor 110 controlling the display unit 120 and the communication unit 130. The display unit 120 includes an LCD, an OLED, or an arbitrary display, and may include a touch panel. Further, the display unit 120 may be a flexible display and have various form factors according to the digital device 100. The digital device 100 may further include a camera unit for image recording and/or a satellite positioning unit. Further, the digital device 100 may further include a power supply source, a memory, and elements for communication and computing.

The unmanned aerial vehicle 200 may include a driving unit 220, a communication unit 230, and a processor 210 controlling the driving unit 220 and the communication unit 230. The driving unit 220 serves to control movement of the unmanned aerial vehicle 200 and may include one or more engines and/or one or more propellers according to the shape of the unmanned aerial vehicle 200. The unmanned aerial vehicle 200 may further include a camera unit for image recording and/or a satellite positioning unit. Further, the unmanned aerial vehicle 200 may further include a power supply source, a memory, and elements for communication and computing.

The communication unit 130 of the digital device 100 and the communication unit 230 of the unmanned aerial vehicle 200 may communicate with each other. Radio frequency communication, Bluetooth, Wi-Fi, 3G and 4G wireless communication, or an arbitrary communication protocol may be used.

Figure 3A:
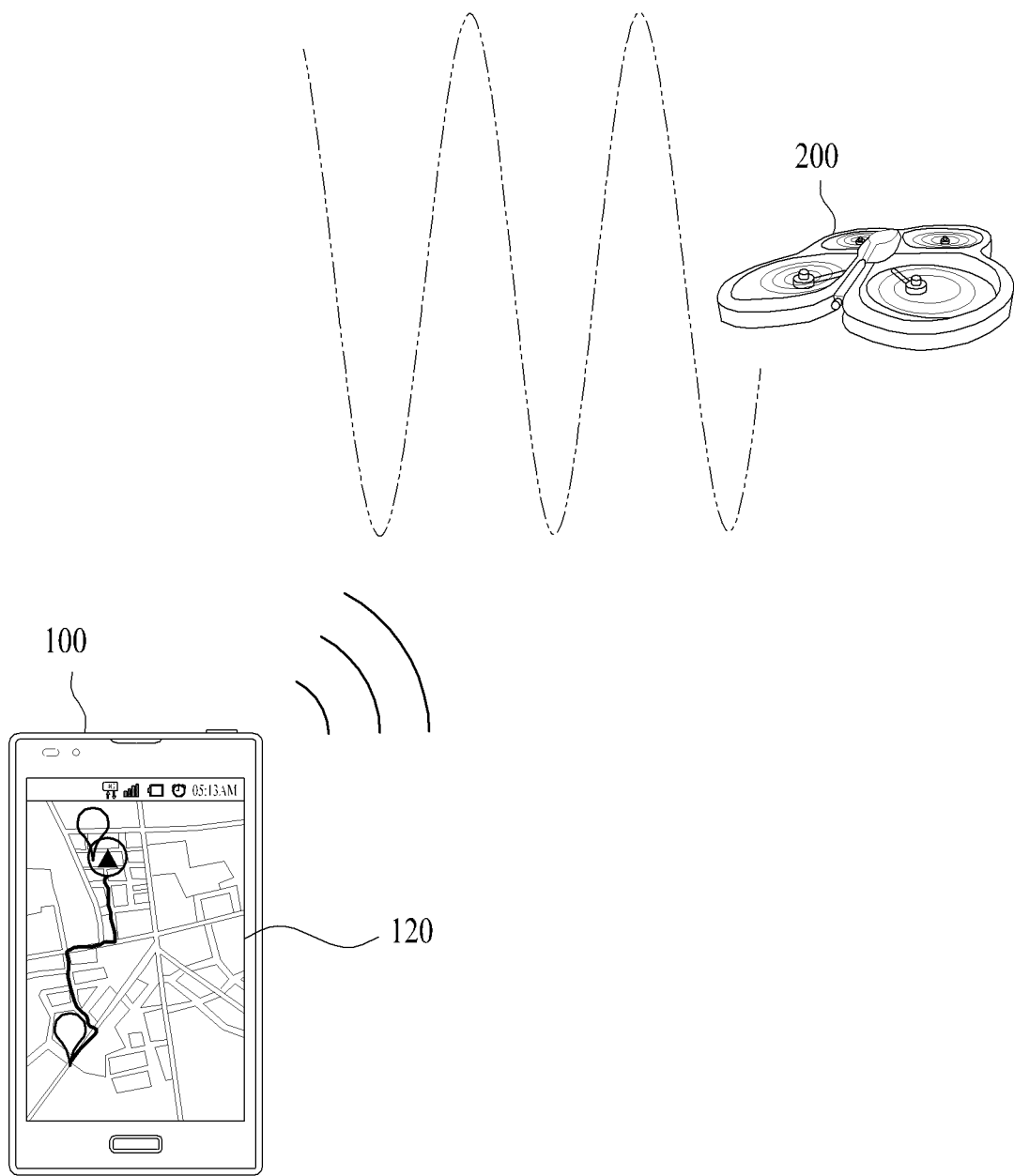
FIGS. 3A and 3B are views illustrating flight trajectory feedbacks of the unmanned aerial vehicle corresponding to applications.
Figure 3B:
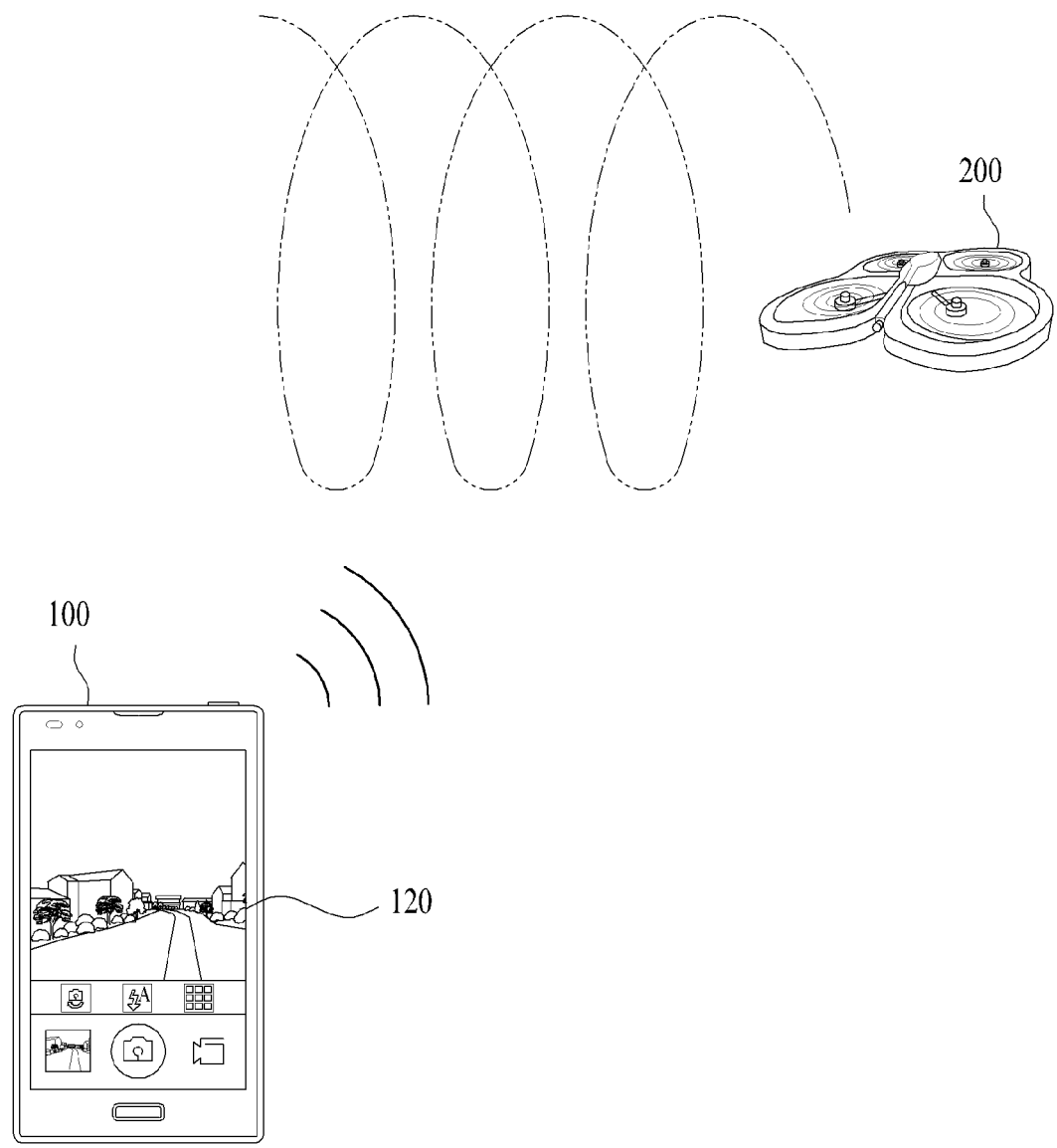

FIGS. 3A and 3B are views illustrating flight trajectory feedbacks of the unmanned aerial vehicle corresponding to applications.

The digital device 100 may transmit application data including information regarding an application executed by the digital device 100 and/or a task of the application to the unmanned aerial vehicle 200 through the communication units 130 and 230. Further, the application data may cause the unmanned aerial vehicle 200 to provide a flight trajectory feedback based on the application data.

As shown in FIG. 3A, a map application is executed by the mobile device 100. The unmanned aerial vehicle 200 provides a flight trajectory feedback based upon which the unmanned aerial vehicle 200 travels while flying up and down in response to the map application. Further, as shown in FIG. 3B, the unmanned aerial vehicle 200 may provide a flight trajectory feedback based upon which the unmanned aerial vehicle 200 travels while flying in a spiral shape in response to a camera application.

The flight trajectory feedbacks shown in FIGS. 3A and 3B are exemplary. One flight trajectory feedback may be selected from a plurality of flight trajectory feedbacks. The unmanned aerial vehicle 200 provides a flight trajectory feedback based on application data and may thus indicate an application executed by the digital device 100 pairing with the unmanned aerial vehicle 200 and/or a task of the application to a user.

Further, respective applications and/or tasks pairing with the unmanned aerial vehicle 200 may have inherent flight trajectory feedbacks. That is, plural flight trajectory feedbacks may correspond to different applications or tasks of the applications. Therefore, the flight trajectory feedback may distinguish the application and/or the task executed by the digital device 100 from other applications and/or tasks. For example, when a user of the digital device 100 executes an arbitrary application and/or task, the user may find out which application and/or task pairs with the unmanned aerial vehicle 200 by observing which flight trajectory feedback is provided by the unmanned aerial vehicle 200.

The flight trajectory feedback may be provided when the unmanned aerial vehicle 200 receives application data. Further, the digital device 100 may transmit application data when the application and/or the task are executed by the digital device 100. Further, the digital device 100 may transmit application data if a designated time interval has passed from transmission time of the previous application data and thus, cause the unmanned aerial vehicle 200 to periodically provide a flight trajectory feedback. Further, the digital device 100 may transmit application data if the digital device 100 receives an application data transmission request.

For example, if a map application is executed by the digital device 100, the digital device 100 transmits application data to the unmanned aerial vehicle 200. If the unmanned aerial vehicle 200 do not provide a flight trajectory feedback, it may mean that the unmanned aerial vehicle 200 did not receive application data. Therefore, the user of the digital device 100 may take subsequent actions for pairing with the unmanned aerial vehicle 200 (for example, re-execution of the application or re-transmission of the application data). Therefore, the user may confirm whether or not the currently executed application and/or task pairs with the unmanned aerial vehicle 200 using the flight trajectory feedback.

Further, if the application executed by the digital device 100 may not pair with the unmanned aerial vehicle 200 (for example, the application is not supported by the unmanned aerial vehicle 200), the unmanned aerial vehicle 200 may not provide a flight trajectory feedback. Further, the unmanned aerial vehicle 20 may provide a flight trajectory feedback indicating that the corresponding application is not supported by the unmanned aerial vehicle 200.

Further, for example, a map application may be executed by the digital device 100 and the unmanned aerial vehicle 200 may provide a flight trajectory feedback corresponding to a camera application. Therefore, the user may correctly recognize which application and/or task from among the plural applications and/or tasks pairs with the unmanned aerial vehicle 200.

For example, plural applications which may be supported by the unmanned aerial vehicle 200 (for example, a map application and a camera application) may be simultaneously executed by the digital device 100. A user may pair the digital device 100 with the unmanned aerial vehicle 200 based on the map application and thus use the unmanned aerial vehicle 200 as a navigator. Simultaneously, the user may photograph by executing the camera application. In this case, even if the map application is executed by the background, the user may desire the unmanned aerial vehicle 200 to maintain pairing with the map application. A user interface to determine with which application from among the executed applications the unmanned aerial vehicle 200 pairs may be provided. When the unmanned aerial vehicle 200 pairing with the existing application does not receive a separate signal to perform pairing with a new application even if the new application is executed, pairing of the unmanned aerial vehicle 200 with the existing application may be maintained. In this case, in spite of reception of new application data, the unmanned aerial vehicle 200 may provide a flight trajectory feedback corresponding to the existing application. Therefore, even if the camera application is executed, the unmanned aerial vehicle 200 may provide the flight trajectory feedback corresponding to the map application and be used still as the navigator. Further, the user may confirm that the unmanned aerial vehicle 200 does not pair with the camera application but pairs with the map application.

Further, as described above, the unmanned aerial vehicle 200 may provide a flight trajectory feedback based on a task of the application executed by the digital device 100. For example, when the map application is executed and a navigation task is executed by the digital device 100, the unmanned aerial vehicle 200 may provide the flight trajectory feedback shown in FIG. 3A. Further, when the map application is executed and a user tracking task is executed by the digital device 100, the unmanned aerial vehicle 200 may provide the flight trajectory feedback shown in FIG. 3B.

FIGS. 4A, 4B, 4D, 4D, and 4E are views illustrating flight trajectory feedbacks of the unmanned aerial vehicle in accordance with the embodiment.

The respective flight trajectory feedbacks may include at least one of an upward and a downward movement, a leftward and a rightward movement, a spiral movement, a circular movement, and a rotating movement and each of the flight trajectory feedbacks may have different flight trajectories from a start point to an end point to each other. Therefore, for example, although a flight trajectory feedback corresponding to execution of the camera application and a flight trajectory feedback corresponding to execution of the map application have the same start and end points, the paths thereof may be different. Further, the flight trajectory feedback may be formed in the shape of at least one of a character, a number, a figure, and a mark.

Figure 4A:
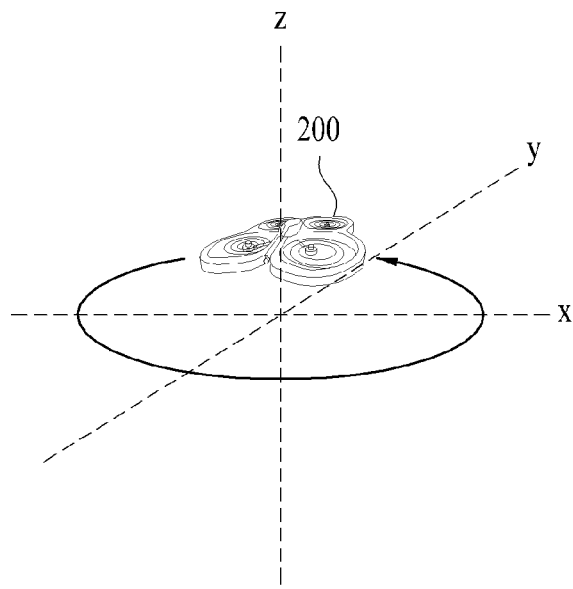
FIGS. 4A, 4B, 4C, 4D and 4E are views illustrating flight trajectory feedbacks of the unmanned aerial vehicle in accordance with one embodiment.
Figure 4B:
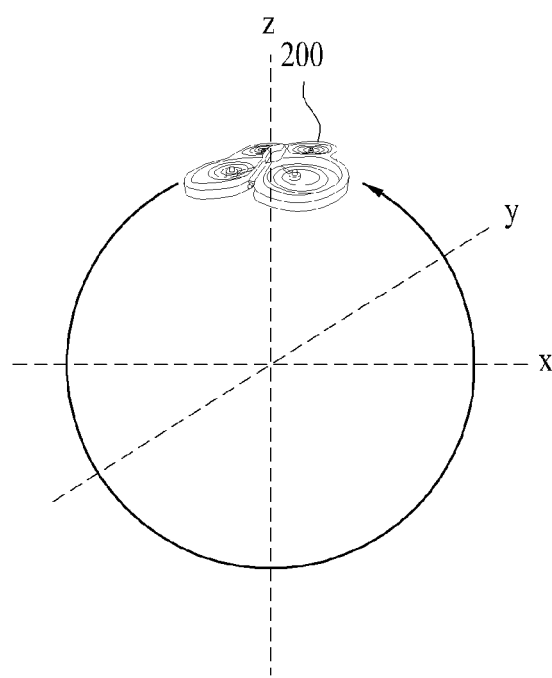

Since the flight trajectory of the unmanned aerial vehicle 200 has 3D coordinates, even if flight trajectory feedbacks have the same circular shape, the flight trajectory feedbacks are different according to about which axes the flight trajectory feedbacks are rotated, as exemplarily shown in FIGS. 4A and 4B.

Figure 4C:
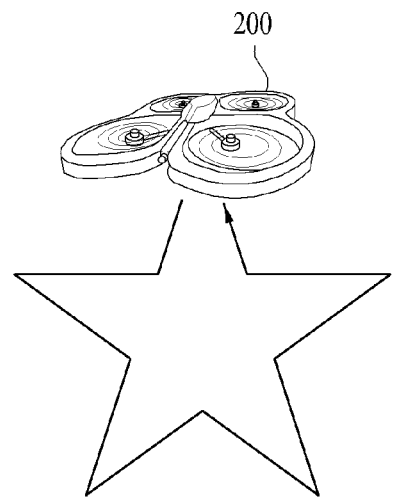
Figure 4D:
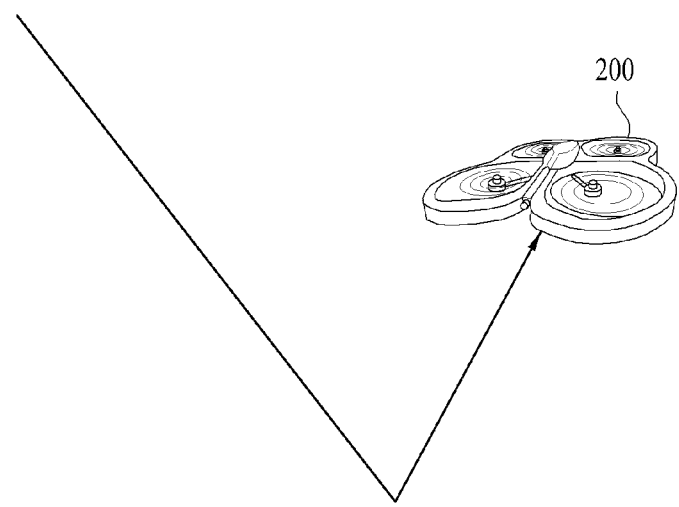
Figure 4E:
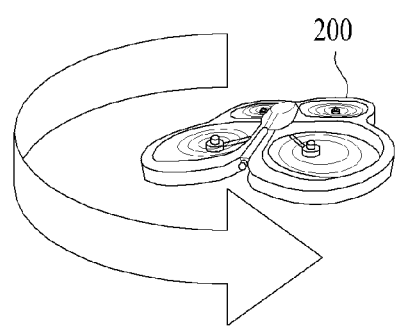

Further, a flight trajectory feedback may have the shape of an arbitrary figure, as shown in FIG. 4C. Further, the unmanned aerial vehicle 200 may provide a V-shaped flight trajectory feedback. Therefore, a flight trajectory feedback may have the shape of an arbitrary character. Further, a flight trajectory feedback may include rotation of the unmanned aerial vehicle 200 in place, and such rotation may include rotation of the unmanned aerial vehicle 200 about the x-axis, the y-axis, the z-axis, or an arbitrary axis.

The flight trajectory feedbacks shown in FIGS. 4A to 4E are exemplary and may include movement in the shape of an arbitrary figure, number, character, or an arbitrary combination thereof. Further, a flight trajectory feedback may be defined based on time as well as 3D coordinates. For example, a flight trajectory feedback of 1 cm/s and a flight trajectory feedback of 5 cm/s may be defined as different flight trajectory feedbacks.

The digital device 100 may select a flight trajectory feedback corresponding to the application and/or the task. The digital device 100 may include flight coordinates corresponding to flight trajectory feedback within application data. The flight coordinates may include 3D coordinates and further include velocity and/or time information. On the other hand, the unmanned aerial vehicle 200 may select a flight trajectory feedback corresponding to the application and/or the task. In this case, the unmanned aerial vehicle 200 may include flight coordinates corresponding to the plural flight trajectory feedbacks. The flight coordinates may include 3D coordinates and further include velocity and/or time information.

Figure 5:
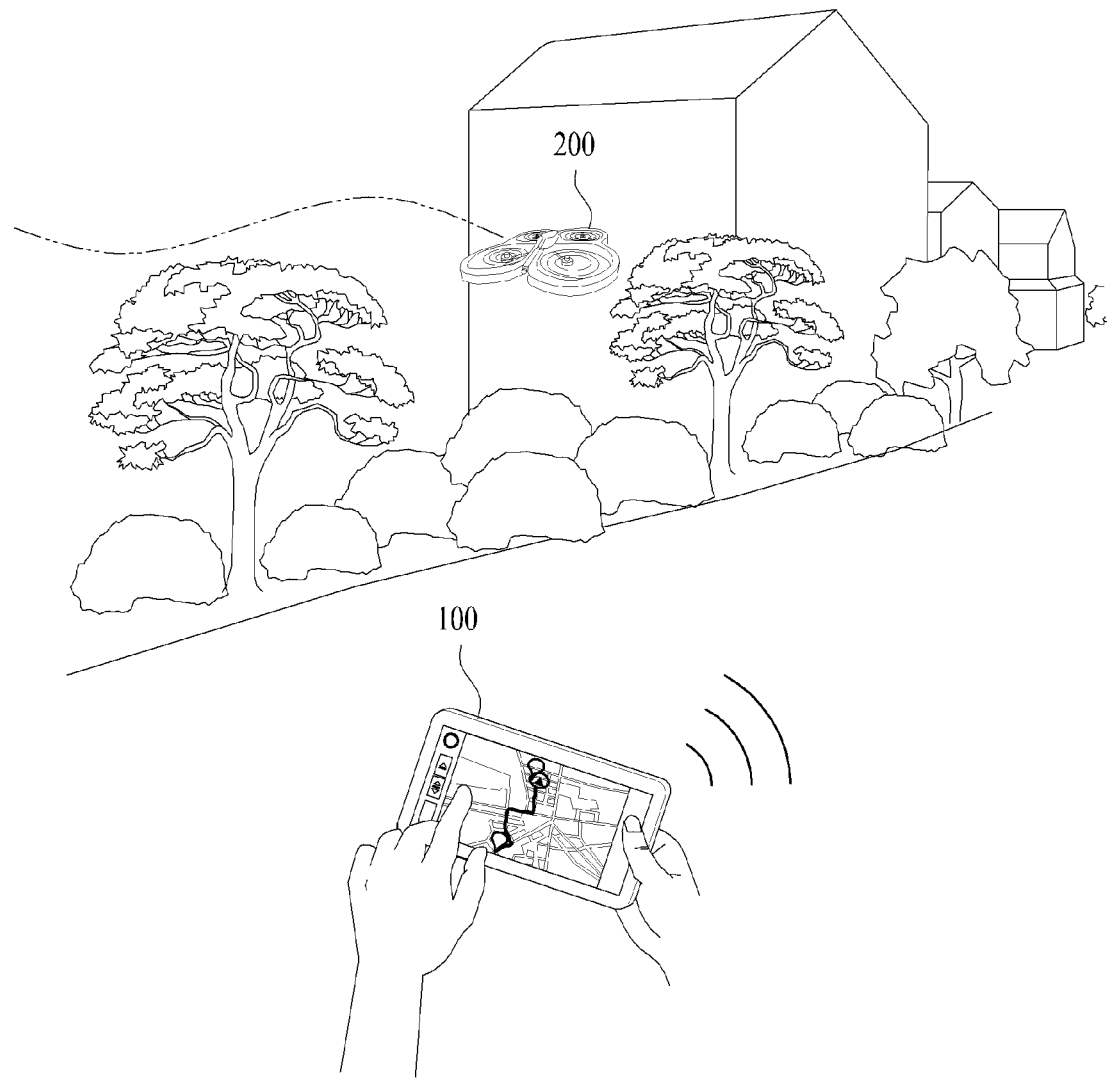
FIG. 5 is a view illustrating change of a flight trajectory feedback of the unmanned aerial vehicle according to surrounding environments.

FIG. 5 is a view illustrating change of a flight trajectory feedback of the unmanned aerial vehicle according to surrounding environments.

As exemplarily shown in FIG. 5, the unmanned aerial vehicle 200 may fly in various environments. For example, the unmanned aerial vehicle 200 may fly in an environment where various obstacles, such as trees and buildings, are present. In some environments, the unmanned aerial vehicle 200 may not easily provide a flight trajectory feedback.

Therefore, the unmanned aerial vehicle 200 may detect a surrounding environment and then change the flight trajectory feedback. The unmanned aerial vehicle 200 may sense the size of a space in which the unmanned aerial vehicle 200 is flyable, obstacles within a flight trajectory, a flight height, and a distance between the digital device 100 and the unmanned aerial vehicle 200 by using a camera, an infrared sensor, a GPS sensor, a gyro sensor, or an arbitrary sensor. Further, the unmanned aerial vehicle 200 may determine at least one of the size, height, and position of a flight trajectory feedback, based on the sensed environment around the unmanned aerial vehicle 200.

For example, if the size of the space in which the unmanned aerial vehicle 200 is flyable is smaller than the size of the determined flight trajectory feedback, the unmanned aerial vehicle 200 may reduce the size of flight trajectory feedback or provide a predetermined substitute flight trajectory feedback. For example, in order to avoid an obstacle, the unmanned aerial vehicle 200 may provide a substitute flight trajectory feedback having rotating movement in place in place of a flight trajectory feedback having upward and downward movement. Further, for example, if an obstacle is present in the flight trajectory of the flight trajectory feedback, the unmanned aerial vehicle 200 may change a position where the flight trajectory feedback will be provided or change the height of the flight trajectory feedback so as to avoid the obstacle.

If the distance between the unmanned aerial vehicle 200 and the digital device 200 is great, a user of the digital device 100 may have difficulty in reading the flight trajectory feedback. Therefore, the unmanned aerial vehicle 200 may change the flight trajectory feedback based on the distance between the digital device 100 and the unmanned aerial vehicle 200. For example, as the distance between the unmanned aerial vehicle 200 and the digital device 200 increases, the unmanned aerial vehicle 200 may provide an increasing flight trajectory feedback. Further, as the distance between the unmanned aerial vehicle 200 and the digital device 200 decreases, the unmanned aerial vehicle 200 may provide a decreasing flight trajectory feedback.

The above-described changes of the flight trajectory feedback with reference to FIG. 5 are exemplary and these changes may be combined.

Figure 6A:
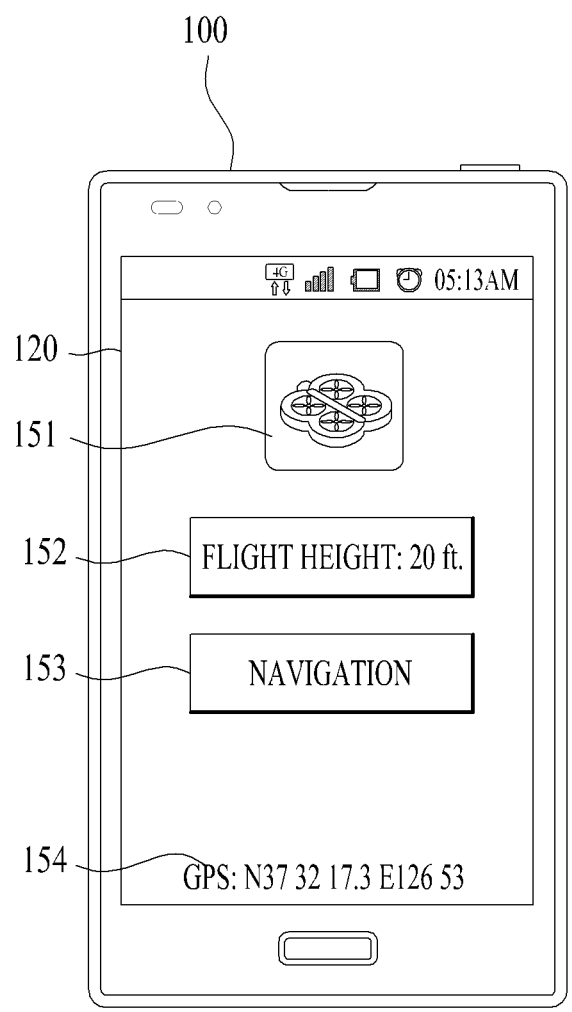
FIGS. 6A and 6B are views illustrating user interfaces displaying the state of the unmanned aerial vehicle in accordance with one embodiment.
Figure 6B:
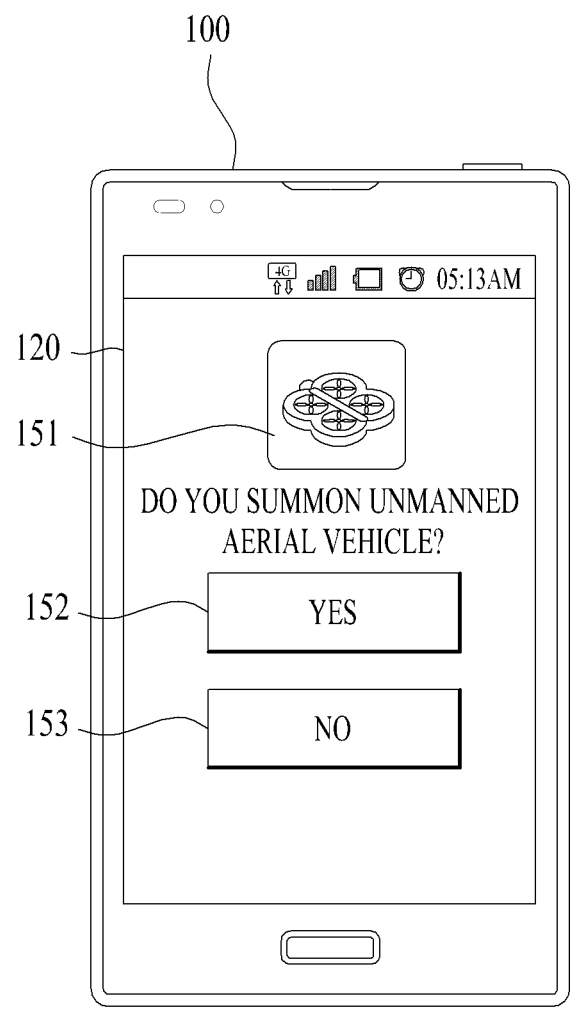

FIGS. 6A and 6B are views illustrating user interfaces displaying the state of the unmanned aerial vehicle in accordance with the embodiment.

The digital device 100 may provide a user interface to display the current state of the unmanned aerial vehicle 200.

As exemplarily shown in FIG. 6A, the user interface may include message boxes 152, 153, and 154 and/or a message line. Further, the user interface may include a state window and/or images to display arbitrary information. FIG. 6A illustrates an unmanned aerial vehicle icon 151, an unmanned aerial vehicle fly height, an application or a task with which the unmanned aerial vehicle 200 pairs, and a position (for example, GPS coordinates) of the unmanned aerial vehicle 200. In addition, the user interface may include at least one of a flying velocity of the unmanned aerial vehicle 200, a direction of the unmanned aerial vehicle 200, a flyable time of the unmanned aerial vehicle 200 and a remaining battery capacity.

As exemplarily shown in FIG. 6B, the digital device 100 may provide a user interface to summon the unmanned aerial vehicle 200. The summons of the unmanned aerial vehicle 200 includes a summons of the unmanned aerial vehicle 200, which is separated from the digital device 100 by a designated distance or more, within a designated distance from the digital device 100. Further, the summons of the unmanned aerial vehicle, when an application and/or a task are executed by the digital device 100, may be performed to pair the unmanned aerial vehicle 200 with the corresponding application and/or task. For example, the unmanned aerial vehicle 200 pairs with a map application and the digital device 100 may execute a new application (for example, a camera application). In this case, in order to determine with which application the unmanned aerial vehicle pairs, the user interface to summon the unmanned aerial vehicle 200 may be provided. When the unmanned aerial vehicle 200 is summoned, the unmanned aerial vehicle 200 may provide a flight trajectory feedback based on the application pairing with the unmanned aerial vehicle 200.

FIGS. 7A, 7B, 7C, 7D, 7E, and 7F are views illustrating user interfaces for pairing the unmanned aerial vehicle and the digital device in accordance with one embodiment.

A user interface may include an image representing the unmanned aerial vehicle 200 (for example, the unmanned aerial vehicle icon 151) and images representing applications (for example, execution displays of the applications, icons of the applications, and/or images relating to arbitrary applications).

Figure 7A:
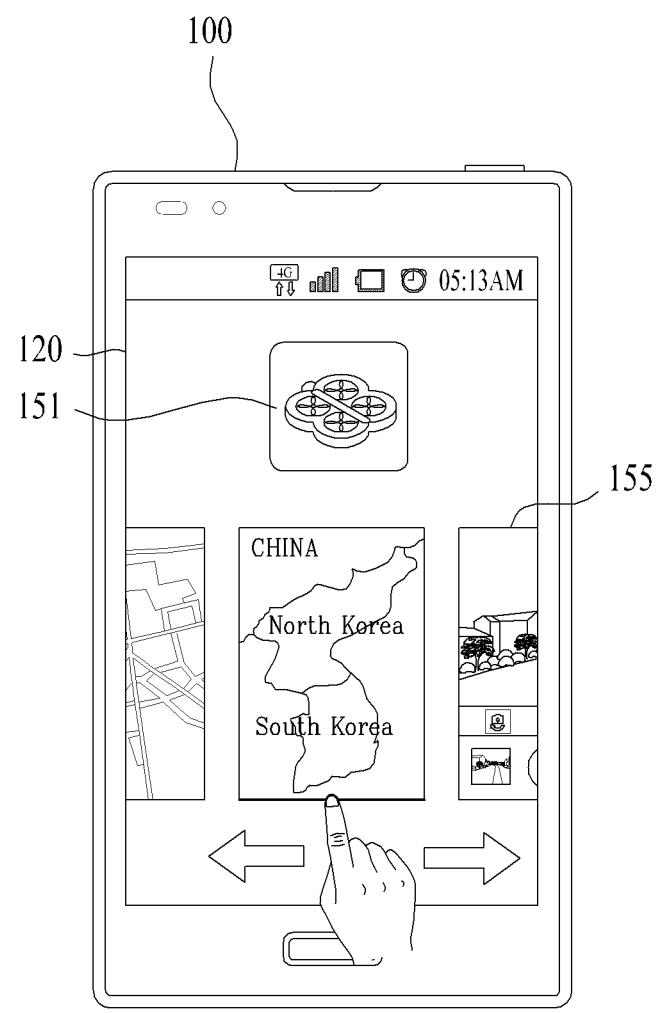
FIGS. 7A, 7B, 7C, 7D, 7E, and 7F are views illustrating user interfaces for pairing the unmanned aerial vehicle and the digital device in accordance with one embodiment.

As exemplarily shown in FIG. 7A, the digital device 100 may provide a user interface including an unmanned aerial vehicle icon 151 and an application list 155. The application list 155 may include images expressing respective applications. The digital device 100 may detect an application image located nearest the unmanned aerial vehicle icon 151 by scrolling the application list 155 leftward and rightward.

Figure 7B:
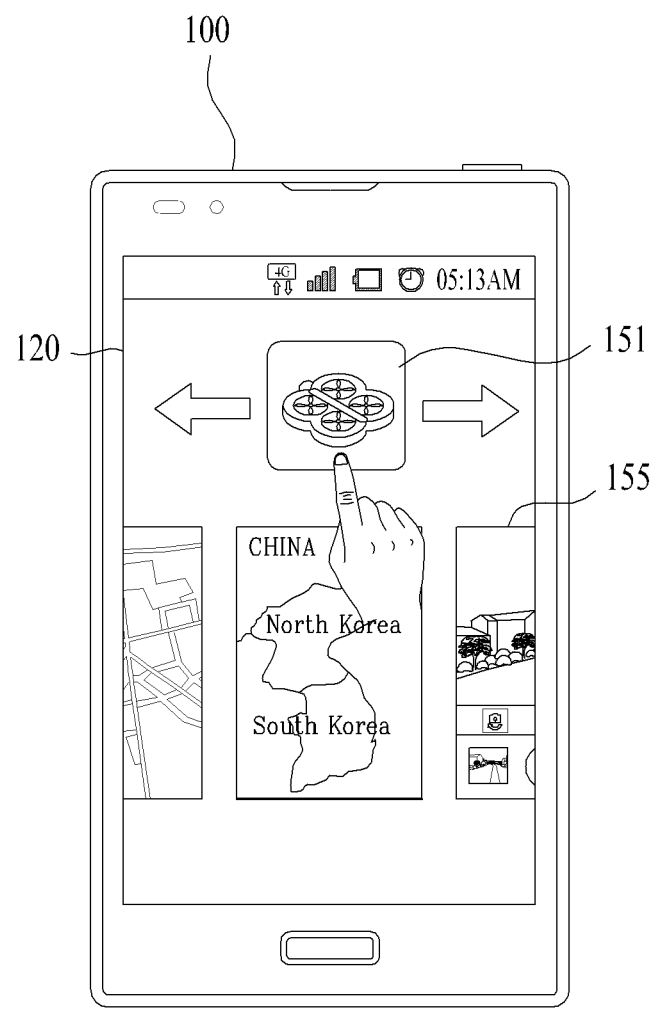

Further, as exemplarily shown in FIG. 7B, the digital device 100 may detect an application image located nearest the unmanned aerial vehicle icon 151 by scrolling or dragging the application list 155 leftward and rightward.

Figure 7C:
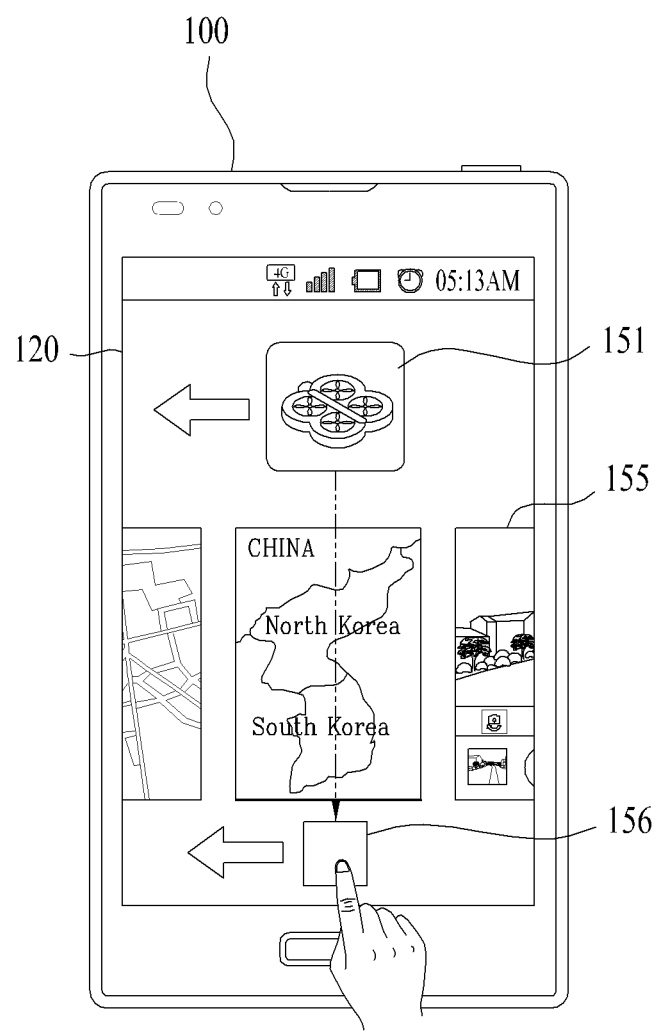

Further, as exemplarily shown in FIG. 7C, a list control user interface 156 to scroll the application list 155 may be provided. As the list control user interface 156 is scrolled leftward and rightward, the application list 155 may be scrolled in the same direction or the opposite direction. Further, the digital device 100 may detect an application image located nearest the unmanned aerial vehicle icon 151 by scrolling the application list 155 leftward and rightward.

Figure 7D:
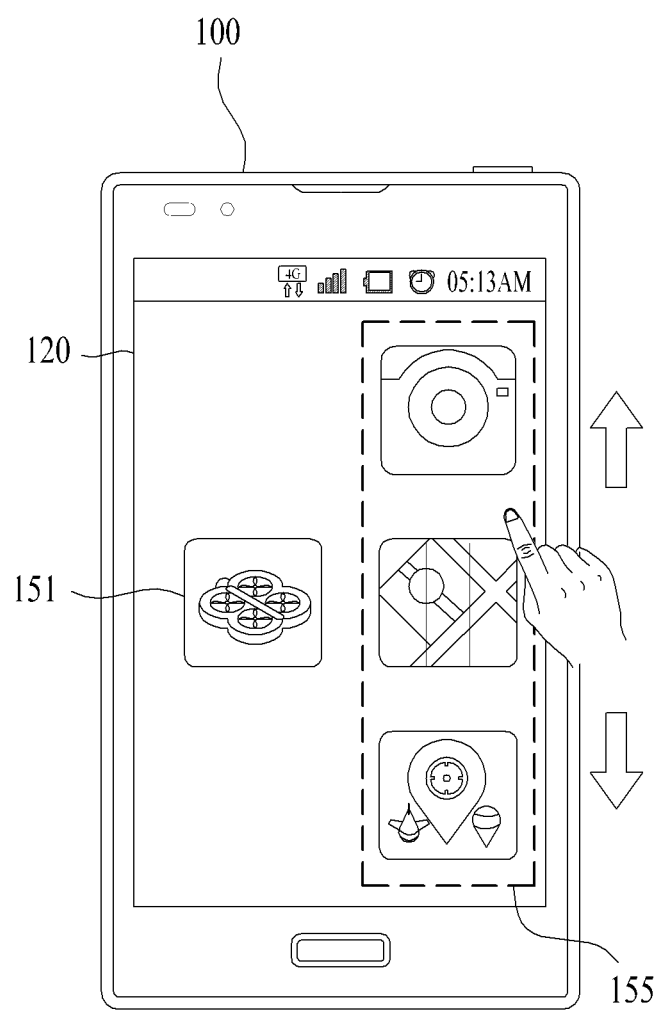

Further, as exemplarily shown in FIG. 7D, the application list 155 may be arranged vertically and scrolled upward and downward. The digital device 100 may detect an application image located nearest the unmanned aerial vehicle icon 151 by scrolling the application list 155 upward and downward.

Figure 7E:
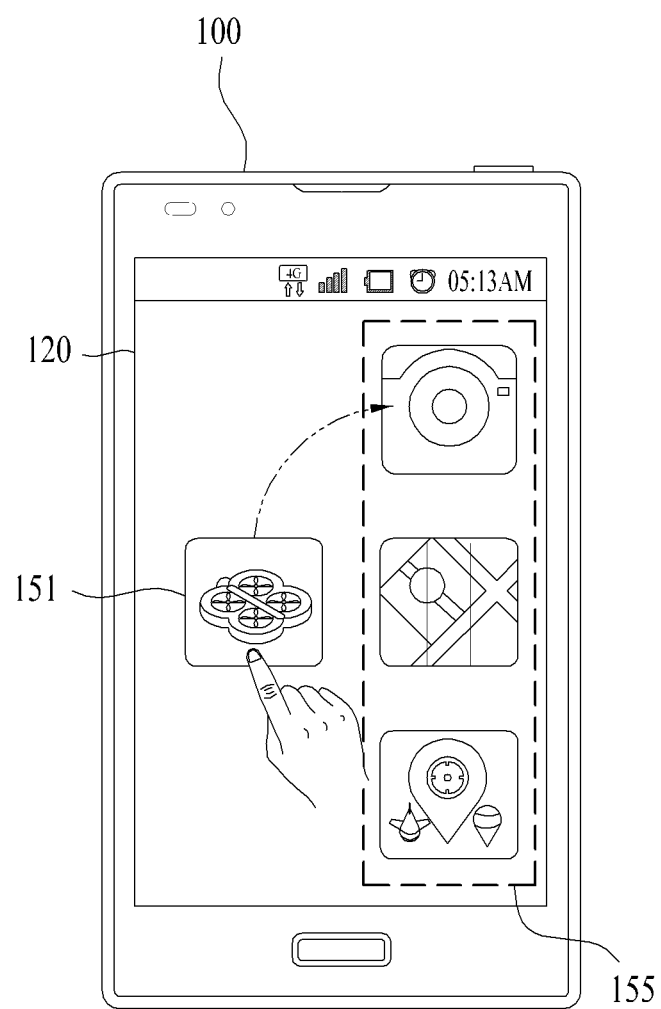

Further, as exemplarily shown in FIG. 7E, the digital device 100 may detect an application image located nearest the unmanned aerial vehicle icon 151 by dragging the unmanned aerial vehicle icon 151.

As described above with reference to FIGS. 7A to 7E, the digital device 100 may detect an application which will pair with the unmanned aerial vehicle 200. Further, the digital device 100 may execute the detected application, transmit application data of the executed application to the unmanned aerial vehicle 200, and thus pair the executed application and the unmanned aerial vehicle 200.

Figure 7F:
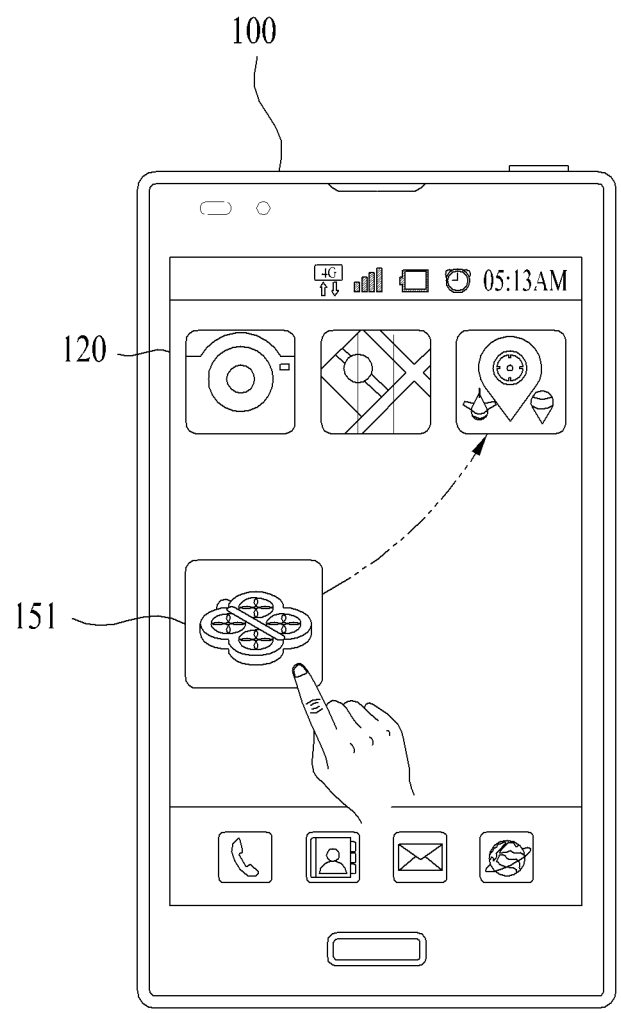

Further, as exemplarily shown in FIG. 7F, an application which will pair with the unmanned aerial vehicle 200 may be determined by drag and drop operation. The digital device 100 may display the unmanned aerial vehicle icon 151 and images (for example, icons and/or widgets) representing other applications in a home picture and/or a background image. Further, the digital device 100 may detect an image of an application overlapping the unmanned aerial vehicle icon 151 by drag and drop operation and execute the application of the corresponding image. The digital device 100 may pair the executed application with the unmanned aerial vehicle 200 by transmitting data of the executed application to the unmanned aerial vehicle 200 simultaneously or sequentially. Therefore, execution of a new application and pairing between the application and the unmanned aerial vehicle 200 may be performed by one action.

The above-described user interfaces with reference to FIGS. 7A to 7F are exemplary and the digital device 100 may provide other arbitrary user interfaces to pair the unmanned aerial vehicle and an application. Further, the application list 155 may include tasks of applications. Further, the unmanned aerial vehicle 200 may provide a flight trajectory feedback according to execution of the application, as described above.

Figure 8:
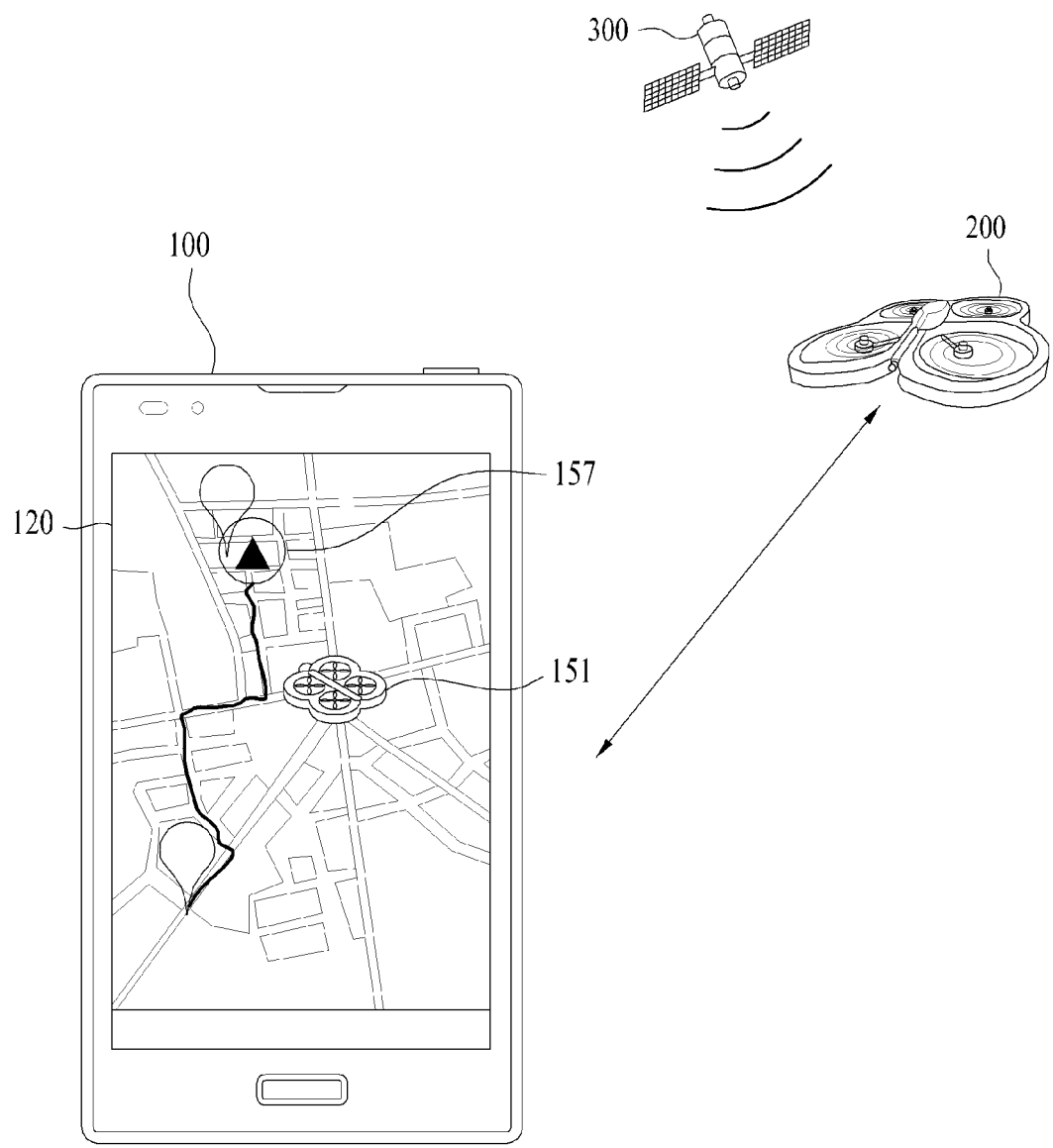
FIG. 8 is a view illustrating a control method of an unmanned aerial vehicle using a satellite positioning system in accordance with one embodiment.

FIG. 8 is a view illustrating a control method of an unmanned aerial vehicle using a satellite positioning system in accordance with one embodiment.

The digital device 100 may include a satellite positioning unit. The application of the digital device 100 may be a map application, a navigation application, or an application requiring position information of the digital device 100. For example, when the map application or the navigation application is executed, the digital device 100 may display a geographic map. Further, the digital device 100 may acquire position information of the digital device 100 from the satellite positioning unit and display a position corresponding to the acquired position information on the geographic map.

Further, the unmanned aerial vehicle 200 may include a satellite positioning unit. The digital device 100 may acquire position information of the unmanned aerial vehicle 200 from the satellite positioning unit of the unmanned aerial vehicle 200. Further, the digital device 100 may display a position corresponding to the acquired position information of the unmanned aerial vehicle 200 on the geographic map.

Therefore, the position(s) of the digital device 100 and/or the unmanned aerial vehicle 200 may be displayed on the display unit 120 of the digital device 100. For example, if the unmanned aerial vehicle 200 is operated as a navigator, the unmanned aerial vehicle 200 may move prior to the digital device 100 by a designated distance on a predetermined path. In this case, a user of the digital device 100 may visually confirm a moving direction through the unmanned aerial vehicle 200. Further, the user may determine a heading direction based on the position(s) of the digital device 100 and/or the unmanned aerial vehicle 200.

If the distance between the digital device 100 and the unmanned aerial vehicle 200 is small (for example, is within a GPS error range), the position of the unmanned aerial vehicle 200 may not be displayed on the map. Further, if the map application is executed by the digital device 100, the unmanned aerial vehicle 200 may move along movement of the digital device 100.

Figure 9A:
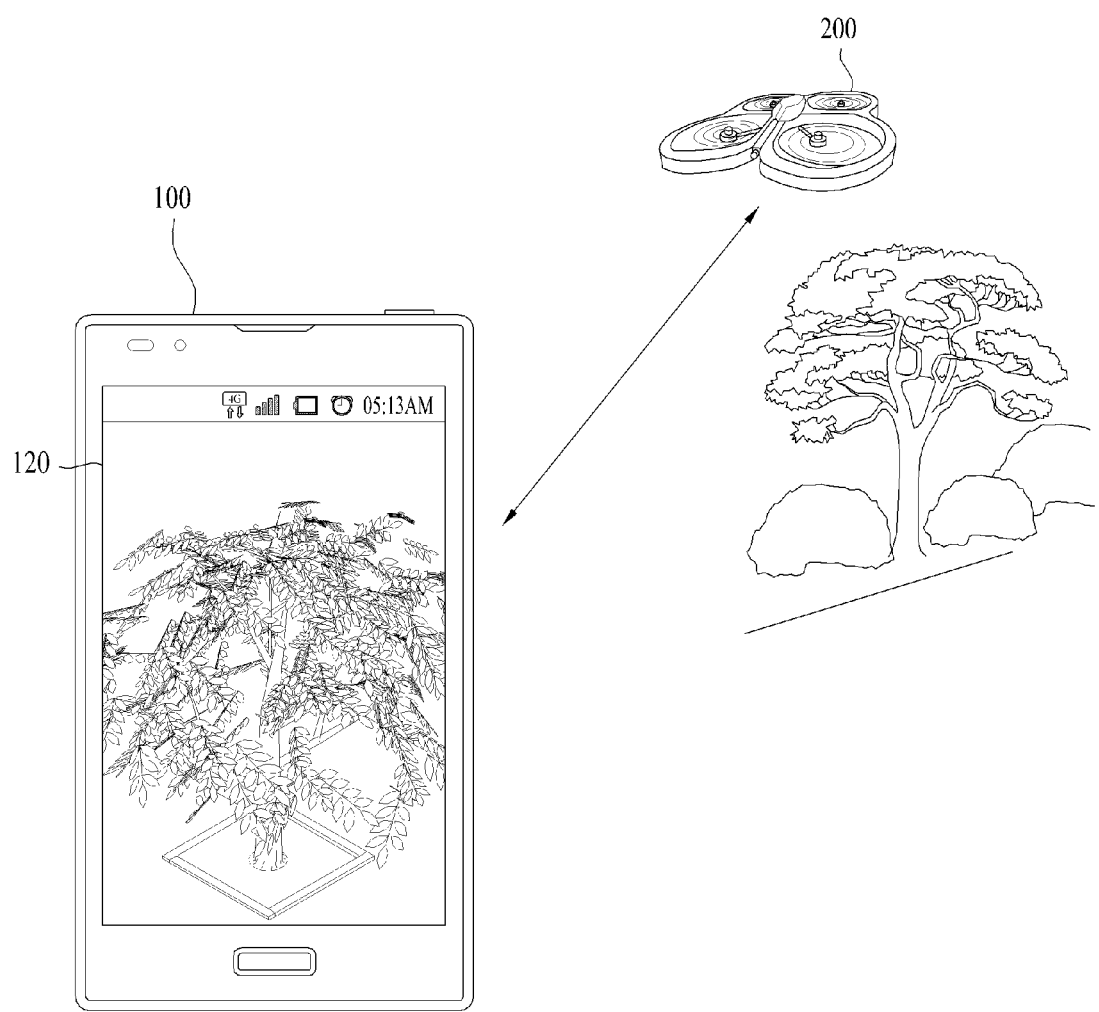
FIGS. 9A and 9B are views illustrating a control method of an unmanned aerial vehicle using an image recording application in accordance with one embodiment.
Figure 9B:
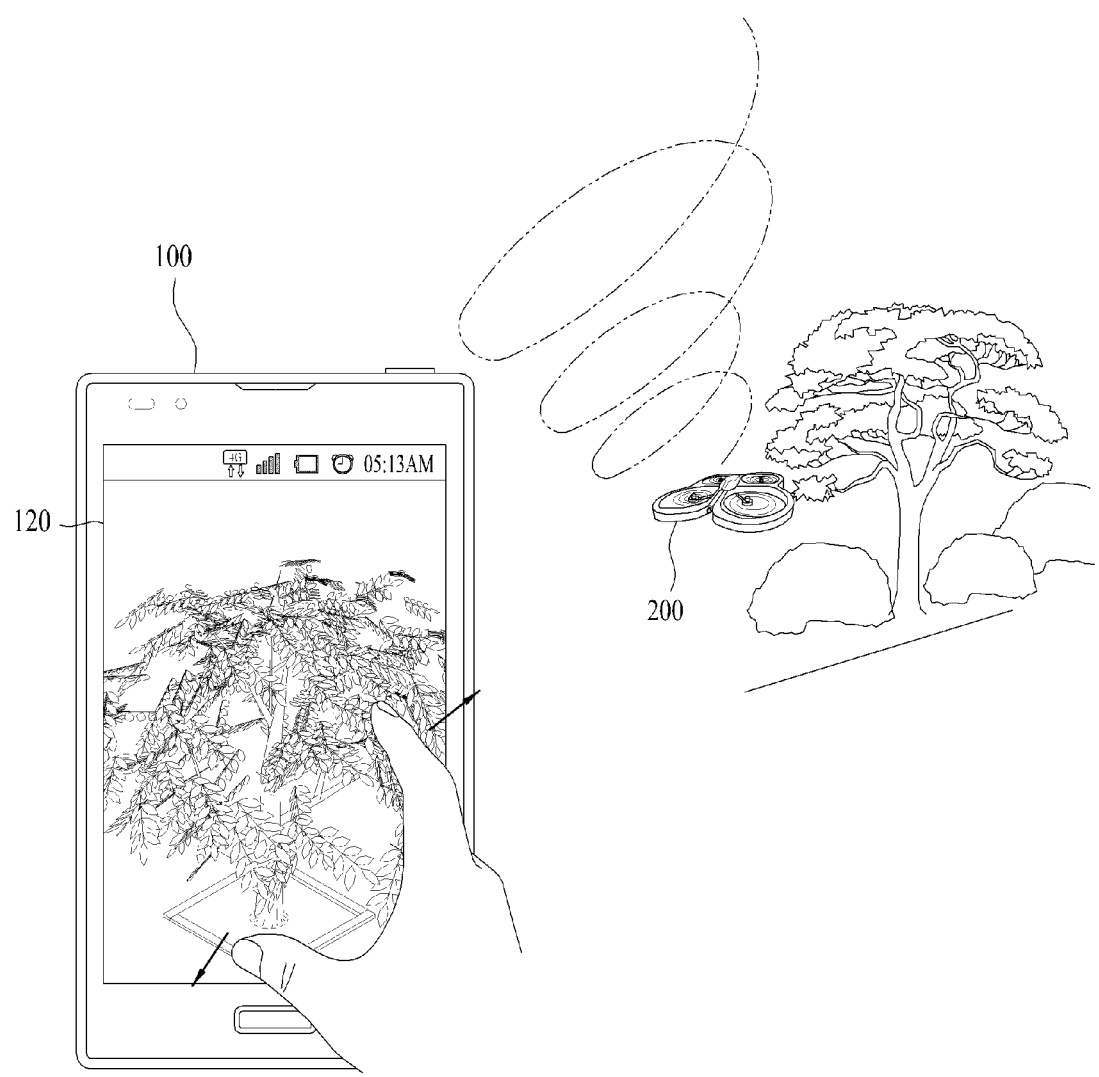

FIGS. 9A and 9B are views illustrating a control method of an unmanned aerial vehicle using an image recording application in accordance with one embodiment.

The unmanned aerial vehicle 200 may include a camera unit. If an image recording application (for example, the camera application) is executed by the digital device 100, the digital device 100 may acquire an image from the camera unit of the unmanned aerial vehicle 200 and display the acquired image on at least a part of the display unit 120.

As exemplarily shown in FIG. 9A, the digital device 100 may acquire images of a place distant from the digital device 100 using the unmanned aerial vehicle 200. The images may include a still image and/or a moving image. Further, the digital device 100 may include a camera unit and each of the digital device 100 and the unmanned aerial vehicle 200 may include a sound recording device (for example, a microphone). Therefore, the digital device 100 may record an image acquired by the digital device 100 and/or an image acquired by the unmanned aerial vehicle 200. Further, the digital device 100 may record sound acquired by the digital device 100 and/or sound acquired by the unmanned aerial vehicle 200. The digital device 100 may provide a user interface to select an image and/or sound supply source.

Further, the digital device 100 may select an image supply source based on at least one of a distance between the digital device 100 and the unmanned aerial vehicle 200, a predetermined mode of image recording, and an angle between the direction of the camera unit of the digital device 100 and the direction of the camera unit of the unmanned aerial vehicle 200. For example, if the unmanned aerial vehicle 200 is distant from the digital device 100 by a designated distance or more, an image from the unmanned aerial vehicle 200 may be selected. Further, if the mode of image recording of the digital device 100 is a self-camera mode, an image from the unmanned aerial vehicle 200 may be selected. Further, if the angle between the direction of the camera unit of the digital device 100 and the direction of the camera unit of the unmanned aerial vehicle 200 is within a designated angle, an image from the unmanned aerial vehicle 200 may be selected.

As exemplarily shown in FIG. 9B, the image recording application (for example, the camera application) of the digital device 100 may include a zoom factor. The digital device 100 may include the camera unit. However, only zoom-in of a designated level or less may be allowed due to limitations on hardware and/or software of the digital device 100. In this case, an image having higher resolution in a higher zoom level may be acquired using the unmanned aerial vehicle 200. For example, a user may adjust the zoom factor by enlarging an image on the display unit 120. The zoom factor may be adjusted, for example, by enlarging the image in both directions or receiving a zoom factor value. If the adjusted zoom factor is a predetermined zoom level or less, the digital device 100 receiving adjustment of the zoom factor may acquire an image from the camera unit of the digital device 100. Further, if the adjusted zoom factor exceeds the predetermined zoom level, the digital device 100 may transmit application data including the adjusted zoom factor to the unmanned aerial vehicle 200 and acquire an image from the camera unit of the digital device 100 by dispatching the unmanned aerial vehicle 200 to a position corresponding to a viewing angle of the adjusted zoom factor. Further, when the unmanned aerial vehicle 200 receives application data including the zoom factor, the unmanned aerial vehicle 200 may provide a flight trajectory feedback.

Figure 10:
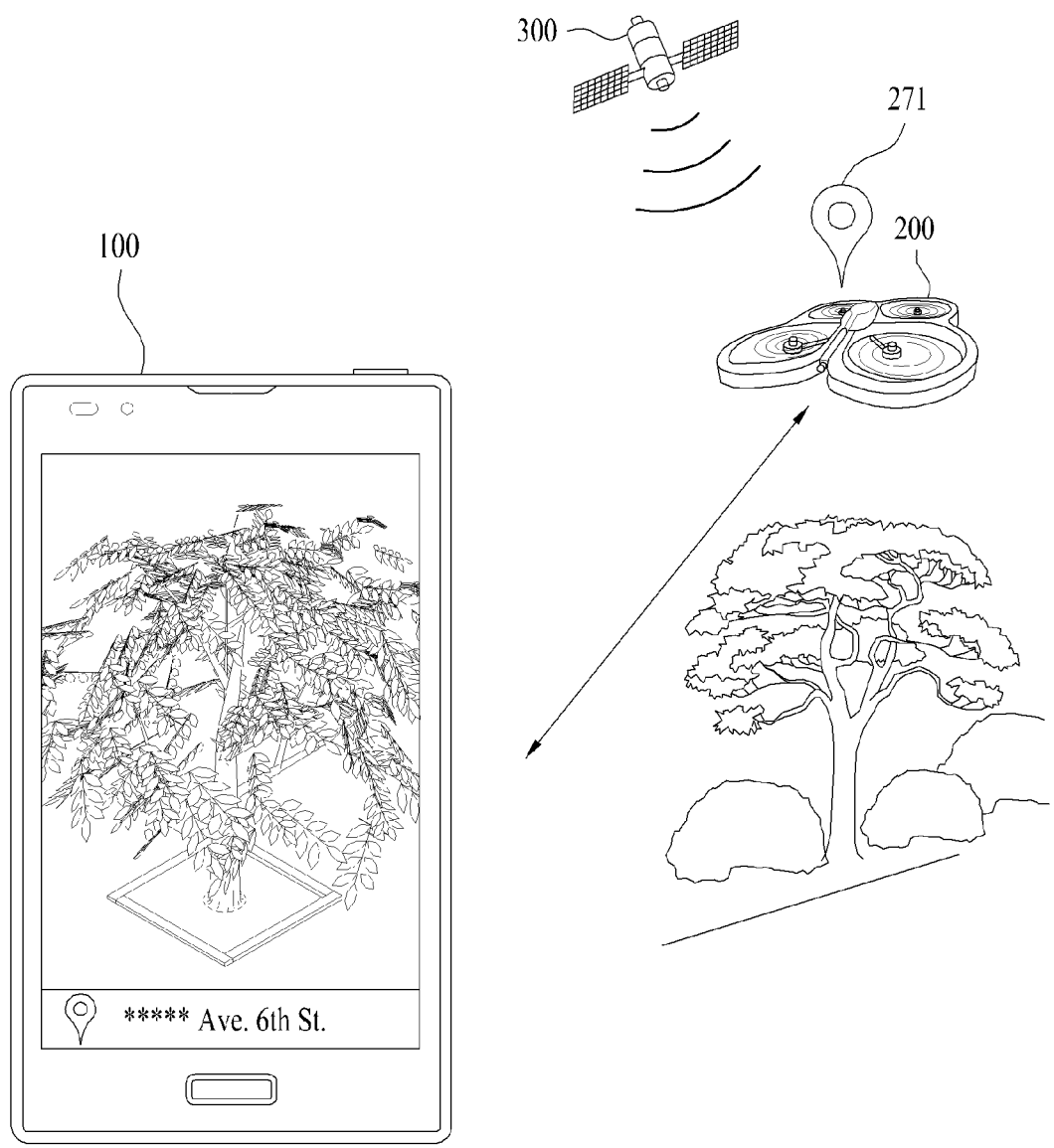
FIG. 10 is a view illustrating a method of using position information of an unmanned aerial vehicle and a camera unit in accordance with one embodiment.

FIG. 10 is a view illustrating a method of using position information of an unmanned aerial vehicle and a camera unit in accordance with one embodiment.

Each of the digital device 100 and the unmanned aerial vehicle 200 may include a satellite positioning unit and a camera unit. As described above with reference to FIGS. 9A and 9B, the digital device 100 may select an image and/or sound supply source. Further, the digital device 100 may record position information together with a recorded image and/or sound. In this case, the digital device 100 may select whether or not position information of the unmanned aerial vehicle 200 is used or position information of the digital device 100 is used.

For example, if the zoom factor of the image recording application of the digital device 100 is a predetermined zoom level or less, the digital device 100 may acquire position information of the digital device 100. On the other hand, if the zoom factor exceeds the predetermined zoom level, the digital device 100 may acquire position information of the unmanned aerial vehicle 200.

Further, for example, if the distance between the digital device 100 and the unmanned aerial vehicle 200 exceeds a predetermined distance, the digital device 100 may acquire position information of the unmanned aerial vehicle 200. On the other hand, if the distance between the digital device 100 and the unmanned aerial vehicle 200 is the predetermined distance or less, the digital device 100 may acquire position information of the digital device 100.

Further, for example, if the image recording mode of the digital device 100 is a self-camera mode, the digital device 100 may acquire position information of the unmanned aerial vehicle 200.

Further, for example, if an image acquired from the unmanned aerial vehicle 200 is recorded, position information of the unmanned aerial vehicle 200 may be acquired. Further, if the unmanned aerial vehicle 200 photographs the image of a position corresponding to the position of the digital device 100 (for example, if a user of the digital device 100 is photographed by the unmanned aerial vehicle 200), position information of the digital device 100 may be acquired.

Figure 11:
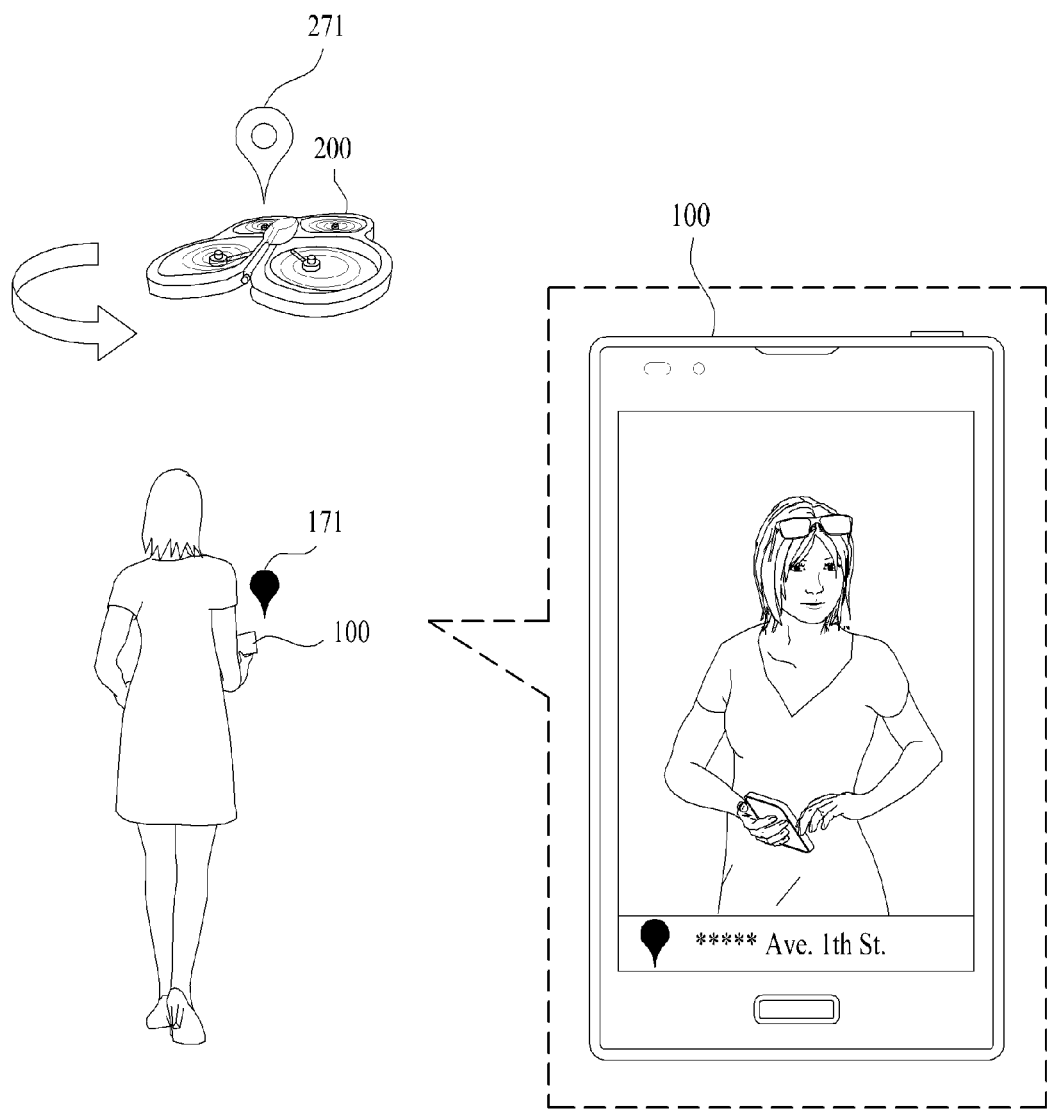
FIG. 11 is a view illustrating one example of image recording using an unmanned aerial vehicle in accordance with one embodiment.

FIG. 11 is a view illustrating one example of image recording using an unmanned aerial vehicle in accordance with one embodiment.

As exemplarily shown in FIG. 11, a user of the digital device 100 may photograph himself/herself using the unmanned aerial vehicle 200. In this case, the user may want to record position information 171 of the digital device 100 rather than position information 271 of the unmanned aerial vehicle 200 as image position information. Therefore, if the unmanned aerial vehicle 200 photographs the position of the digital device 100, both an image acquired from the unmanned aerial vehicle 200 and the position information 171 of the digital device 100 may be recorded.

For example, if the photographing direction of the camera unit of the unmanned aerial vehicle 200 faces the digital device 100, the digital deice 100 may record the position information 171 of the digital device 100 together with an image. For example, if an angle between the photographing direction of the camera unit of the unmanned aerial vehicle 200 and the photographing direction of the camera unit of the digital device 100 is within a designated angle, it may be judged that the photographing direction of the camera unit of the unmanned aerial vehicle 200 faces the digital device 100. Further, if it is judged that the user of the digital device 100 is present in an image from the unmanned aerial vehicle 200, it may be judged that the photographing direction of the camera unit of the unmanned aerial vehicle 200 faces the digital device 100. It may be determined, for example, using face recognition of the image from the unmanned aerial vehicle 200.

The above-described control methods of the unmanned aerial vehicle 200 with reference to FIGS. 9A to 11 may be combined. Therefore, the digital device 100 may select position information and/or an image supply source, for example, based on at least one of the distance between the digital device 100 and the unmanned aerial vehicle 200, the predetermined mode of image recording, and the angle between the direction of the camera unit of the digital device 100 and the direction of the camera unit of the unmanned aerial vehicle 200.

The above-described control methods of the unmanned aerial vehicle 200 with reference to FIGS. 9A to 11 may accompany a visual feedback. For example, if the camera application is executed, if the unmanned aerial vehicle 200 is dispatched according to adjustment of the zoom factor, or if the photographing mode of the camera application is changed to photograph the user of the digital device 100, the unmanned aerial vehicle may provide a flight trajectory feedback.

Further, the unmanned aerial vehicle 200 may be controlled so as to move along a predetermined filming sequence. For example, a specific image (for example, a moving image or a photograph) may be used as a reference of the filming sequence. A filming sequence similar to a specific image may be acquired by analyzing the filming angle and filming distance of the specific image and moving the unmanned aerial vehicle 200 based on the corresponding filming angle and filming distance. It may be acquired by transmitting GPS coordinates on a time axis and relative coordinates of the digital device 100 to the unmanned aerial vehicle 200. In this case, the unmanned aerial vehicle 200 may provide a flight trajectory feedback corresponding to a cue sign representing start of filming.

Figure 12:
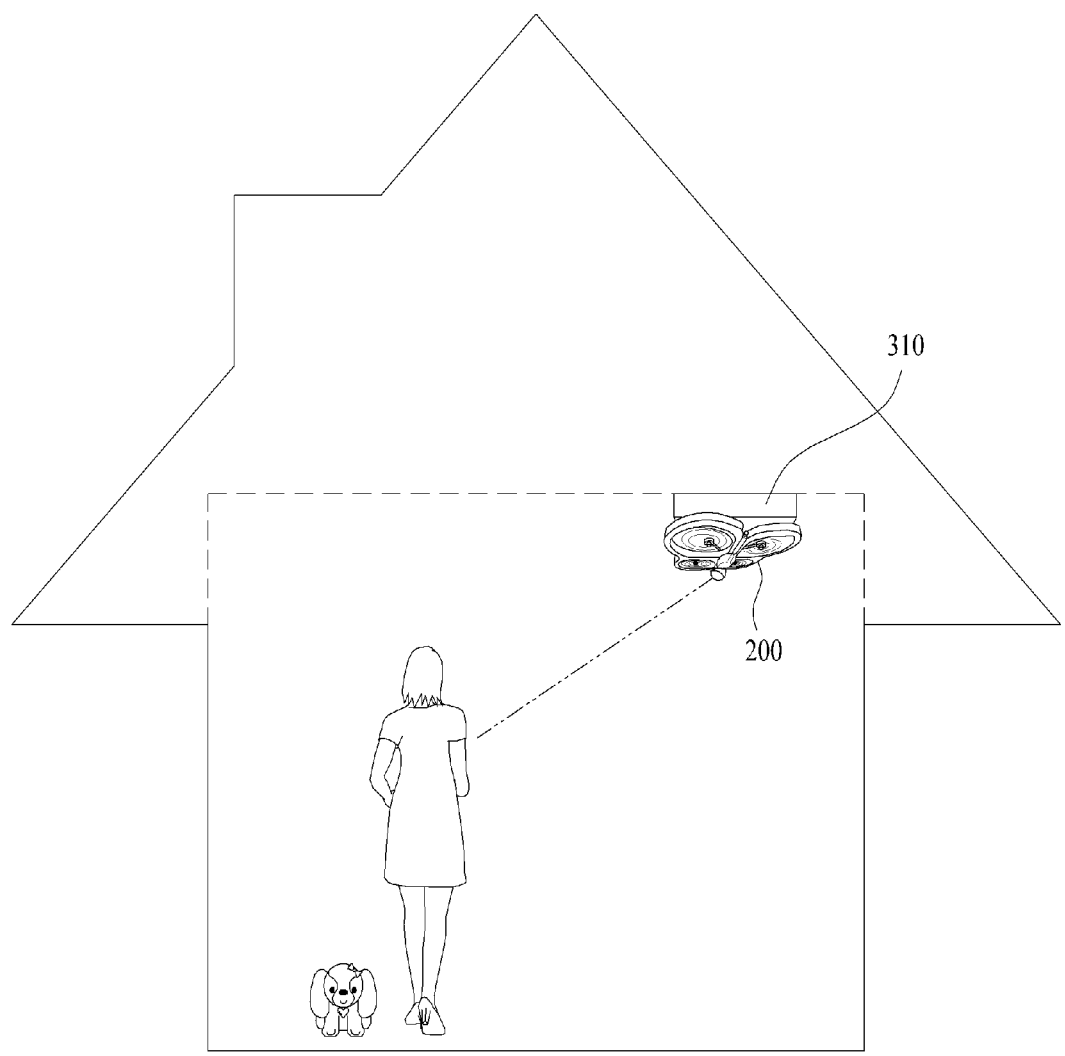
FIG. 12 is a view illustrating one example of usage of an unmanned aerial vehicle in an indoor space in accordance with one embodiment.

FIG. 12 is a view illustrating one example of usage of an unmanned aerial vehicle in an indoor space in accordance with one embodiment.

The unmanned aerial vehicle 200 may be combined with a separate charging dock 310. The charging dock 310 may be located on the ceiling of an indoor space and the unmanned aerial vehicle 200 may be combined with the charging dock 310, for example, through a mechanical or magnetic method. Further, the unmanned aerial vehicle 200 may be used as a CCTV (Closed Circuit Television) in an indoor space. The digital device 100 may acquire an image from the unmanned aerial vehicle 200 using wireless communication. Further, the unmanned aerial vehicle 200 may communicate with a separate server and other digital devices may acquire an image from the unmanned aerial vehicle 200 through the server.

Further, the unmanned aerial vehicle 200 may acquire an image from the camera unit of the unmanned aerial vehicle 200 and analyze the acquired image. If it is judged that there is an invader from the acquired image, the unmanned aerial vehicle 200 may track the invader. Further, if it is judged that there is an invader, the unmanned aerial vehicle 200 may transmit an image of the invader to a predetermined device. The unmanned aerial vehicle 200 may judge the invader using face recognition.

Further, the unmanned aerial vehicle 200 may judge whether or not there is an invader by judging whether or not there is a specific digital device in an indoor space. Further, if movement is sensed and a signal from a specific digital device is not received in a designated time, the unmanned aerial vehicle 200 may judge that there is an invader. The above-describe methods to judge whether or not there is an invader are exemplary and the unmanned aerial vehicle 200 may include at least one of a camera unit, an infrared sensor, a motion sensor, and an acoustic sensor so as to judge whether or not there is an invader. Further, the unmanned aerial vehicle 200 may communicate with at least one of the camera unit, the infrared sensor, the motion sensor, and the acoustic sensor.

Figure 13:
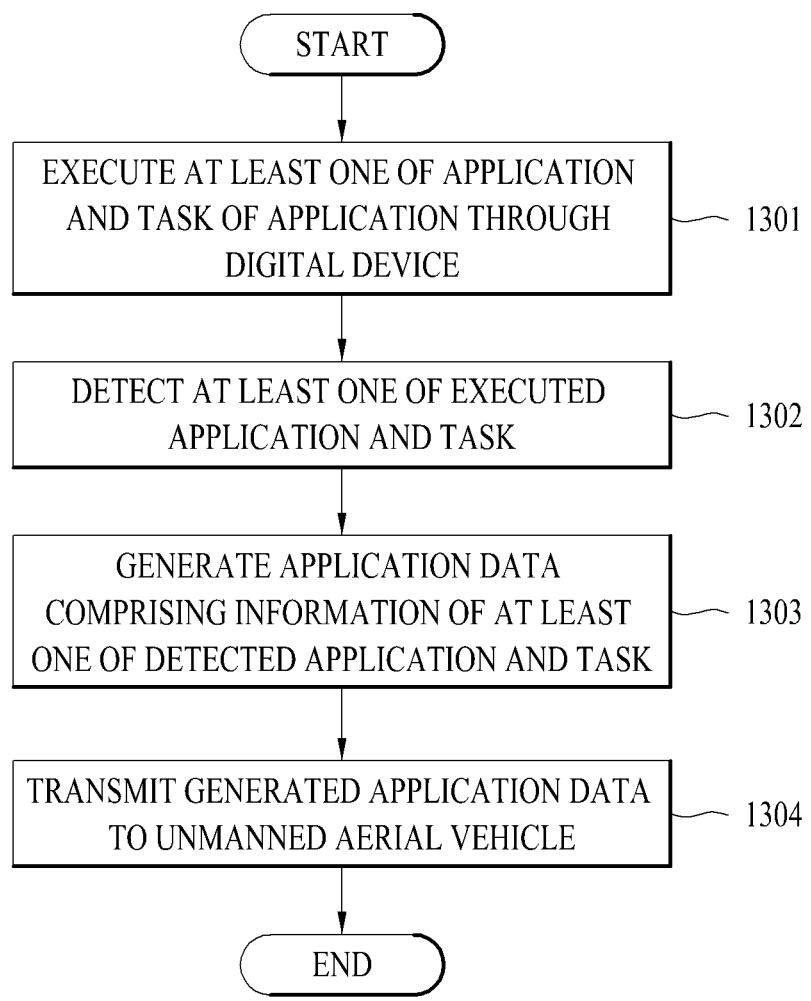
FIG. 13 is a flowchart illustrating an unmanned aerial vehicle control method in accordance with one embodiment.

FIG. 13 is a flowchart illustrating an unmanned aerial vehicle control method in accordance with one embodiment.

At least one of an application and a task of the application may be executed by the digital device (Operation 1301). The digital device may detect the least one of the executed application and task (Operation 1302). Further, the digital device may generate application data including information of the least one of the detected application and task (Operation 1303). Further, the digital device may transmit the generated application data to the unmanned aerial vehicle (Operation 1304). As described above with reference to FIGS. 1 and 2, the digital device and the unmanned aerial vehicle may include various types of devices and communicate with each other.

The application data causes the unmanned aerial vehicle to provide a flight trajectory feedback determined based on the application data. As described above with reference to FIGS. 3A and 3B, the unmanned aerial vehicle may pair with the digital device based on various applications and/or tasks and provide a flight trajectory feedback, thus displaying an application and/or a task pairing with the unmanned aerial vehicle to a user.

The flight trajectory feedback is one of a plurality of predetermined flight trajectory feedbacks and may display an application and/or a task of the application of the digital device which will pair with the unmanned aerial vehicle. Further, the plural flight trajectory feedbacks may correspond to different pieces of application data, respectively. Further, as described above with reference to FIGS. 4A to 4E, the flight trajectory feedbacks may have various shapes and the application data may include flight coordinates corresponding to the flight trajectory feedbacks. A flight trajectory feedback may be selected by the unmanned aerial vehicle. Further, as described above with reference to FIG. 5, the unmanned aerial vehicle may change the flight trajectory feedback based on a surrounding environment.

Further, as described above with reference to FIGS. 6A to 7F, the digital device may provide a user interface to display the state of the unmanned aerial vehicle and provide a user interface to select an application and/or a task which will pair with the unmanned aerial vehicle.

Further, as described above with reference to FIG. 8, the digital device may display the position of the unmanned aerial vehicle on a map using position information of the unmanned aerial vehicle and use the unmanned aerial vehicle as a navigator.

Further, as described above with reference to FIGS. 9A to 11, the digital device may use position information of the unmanned aerial vehicle and an image from the unmanned aerial vehicle.

Further, as described above with reference to FIG. 12, the unmanned aerial vehicle may be used as a CCTV and perform a function of tracking an invader and/or a function of photographing the invader.

The unmanned aerial vehicle control apparatus and method disclosed in the specification is not limited to the configurations and methods of the above-described embodiments and all or some of these embodiments may be selectively combined so that various modifications are possible.

The unmanned aerial vehicle control apparatus and method in the specification may be implemented as software in a recording medium readable by the processor provided in the digital device. The recording medium readable by the processor may be one of all kinds of recording devices in which data readable by the processor are stored. For example, the recording medium readable by the processor may include a ROM, a RAM, a CD-ROM, a magnetic tape, a floppy disk, an optical data storage medium, or a carrier wave, such as data transmission over the Internet. Further, the recording medium readable by the processor may be distributed in a computer system connected through a network and thus, a code readable by the processor may be stored and executed by a distributed manner.

As apparent from the above description, an unmanned aerial vehicle control apparatus and method in accordance with various embodiments may provide a flight trajectory feedback and thus effectively control an unmanned aerial vehicle.

Further, the unmanned aerial vehicle control apparatus and method provides an interface to pair the unmanned aerial vehicle and an application and/or a task and thus, the unmanned aerial vehicle may be easily controlled.

Further, the unmanned aerial vehicle control apparatus and method selectively uses a camera unit and a positioning unit of the unmanned aerial vehicle and may thus provide convenience to a user.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A digital device comprising:
   a communication unit configured to communicate with an unmanned aerial vehicle;
   a display unit; and
   a processor configured to control the communication unit and the display unit,
   wherein the processor is further configured to transmit application data comprising information of at least one of an application executed by the digital device and a task of the application to the unmanned aerial vehicle through the communication unit,
   wherein the application data causes the unmanned aerial vehicle to provide a flight trajectory feedback determined based on the application data to the digital device,
   wherein the flight trajectory feedback is one of a plurality of predetermined flight trajectory feedbacks and indicates at least one of the application and the task of the digital device pairing with the unmanned aerial vehicle,
   wherein each of the plurality of flight trajectory feedbacks corresponds to different applications or tasks, respectively, and
   wherein the tasks include a navigation task and a user tracking task.

2. The digital device according to claim 1, wherein the processor is further configured to transmit the application data, if the digital device executes at least one of the application and the task.

3. The digital device according to claim 2, wherein the processor is further configured to transmit the application data, if a predetermined time interval has passed from the previous application data transmission time or if the processor receives an application data transmission request.

4. The digital device according to claim 1, wherein the application data comprises flight coordinates corresponding to the flight trajectory feedback.

5. The digital device according to claim 1, wherein each of the plurality of predetermined flight trajectory feedbacks comprises at least one of an upward and a downward movement, a leftward and a rightward movement, a spiral movement, a circular movement, and a rotating movement, and has different flight trajectories from a start point to an end point to each other.

6. The digital device according to claim 5, wherein each of the plurality of predetermined flight trajectory feedbacks is formed in the shape of at least one of a character, a number, a figure, and a mark.

7. The digital device according to claim 1, wherein the processor is further configured to display at least one of a flying height of the unmanned aerial vehicle, a flyable time of the unmanned aerial vehicle, a distance between the digital device and the unmanned aerial vehicle, a direction of the unmanned aerial vehicle, an application with which the unmanned aerial vehicle pairs, and a task with which the unmanned aerial vehicle pairs on the display unit.

8. The digital device according to claim 1, wherein the processor is further configured to display an application list including first images expressing a plurality of applications of the digital device and a second image expressing the unmanned aerial vehicle on the display unit.

9. The digital device according to claim 8, wherein the processor is further configured to:
detect the first image located nearest to the second image by a drag operation of the second image;
execute an application corresponding to the detected first image in the digital device; and
pair the executed application with the unmanned aerial vehicle by transmitting application data of the executed application to the unmanned aerial vehicle.

10. The digital device according to claim 8, wherein the processor is further configured to:
detect the first image located nearest the second image by scrolling the application list;
execute an application corresponding to the detected first image in the digital device; and
pair the executed application with the unmanned aerial vehicle by transmitting application data of the executed application to the unmanned aerial vehicle.

11. The digital device according to claim 8, wherein the processor is further configured to:
display the first images and the second image as icons on the display unit;
detect a first image overlapping the second image by drag and drop operation;
execute an application corresponding to the detected first image in the digital device; and
pair the executed application with the unmanned aerial vehicle by transmitting application data of the executed application to the unmanned aerial vehicle.

12. The digital device according to claim 1, further comprising a first satellite positioning unit, wherein the processor is further configured to:
acquire position information of the digital device from the first satellite positioning unit;
display a geographic map on the display unit based on at least one of an application executed by the digital device and a task of the application; and
display a position corresponding to the position information of the digital device acquired from the first positioning unit on the geographic map.

13. The digital device according to claim 12, wherein the processor is further configured to:
acquire position information of the unmanned aerial vehicle from a second satellite positioning unit of the unmanned aerial vehicle; and
display a position corresponding to the position of the unmanned aerial device acquired from the second satellite positioning unit on the geographic map.

14. The digital device according to claim 1, further comprising a first camera unit, wherein:
the unmanned aerial vehicle comprises a second camera unit; and
the processor is further configured to display an image acquired from the second camera unit on at least a part of the display unit.

15. The digital device according to claim 14, wherein, if an image recording application including a zoom factor is executed by the digital device, the processor is further configured to:
receive adjustment of the zoom factor;
if the adjusted zoom factor is a predetermined zoom level or less, acquire an image from the first camera unit; and
if the adjusted zoom factor exceeds the predetermined zoom level, transmit application data including the adjusted zoom factor to the unmanned aerial vehicle and acquire an image from the second camera unit by dispatching the unmanned aerial vehicle to a position corresponding to a viewing angle of the adjusted zoom factor.

16. The digital device according to claim 15, further comprising a first satellite positioning unit, wherein:
the unmanned aerial vehicle further comprises a second satellite positioning unit; and
the processor is configured to acquire position information from the first positioning unit, if the adjusted zoom factor is the predetermined zoom level or less, and to acquire position information from the second positioning unit, if the adjusted zoom factor exceeds the predetermined zoom level.

17. The digital device according to claim 1, further comprising a first satellite positioning unit and a first camera unit, wherein:
the unmanned aerial vehicle comprises a second satellite positioning unit and a second camera unit;
at least one of the application and the task includes image recording; and
the processor is further configured to select at least one of an image from the first camera unit and an image from the second camera unit and to select at least one position information from the first satellite positioning unit and position information from the second satellite positioning unit, based on at least one of a distance between the digital device and the unmanned aerial vehicle, a predetermined mode of the image recording, and an angle between the direction of the first camera unit and the direction of the second camera unit.

18. A method of controlling a digital device, the method comprising:
executing, via the digital device, at least one of an application and a task of the application; and
transmitting, through a communication unit of the digital device, application data comprising information of the at least one of the application executed by the digital device and the task of the application to an unmanned aerial vehicle,
wherein the application data causes the unmanned aerial vehicle to transmit a flight trajectory feedback determined based on the application data to the digital device through a communication unit of the unmanned aerial vehicle, wherein the flight trajectory feedback is one of a plurality of predetermined flight trajectory feedbacks and indicates the at least one of the application and the task of the digital device pairing with the unmanned aerial vehicle, wherein each of the plurality of flight trajectory feedbacks corresponds to different applications or tasks, respectively, and wherein the tasks include a navigation task and an user tracking task.

* * * * *